US011636135B2

(12) United States Patent
Islam et al.

(10) Patent No.: US 11,636,135 B2
(45) Date of Patent: *Apr. 25, 2023

(54) IDENTIFYING MISSING BROWSE NODES

(71) Applicant: eBay Inc., San Jose, CA (US)

(72) Inventors: Atiq Islam, San Jose, CA (US); Nish Parikh, Fremont, CA (US); Neeraj Garg, Sunnyvale, CA (US)

(73) Assignee: EBAY INC., San Jose, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/323,617

(22) Filed: May 18, 2021

(65) Prior Publication Data

US 2021/0279261 A1 Sep. 9, 2021

Related U.S. Application Data

(63) Continuation of application No. 15/290,283, filed on Oct. 11, 2016, now Pat. No. 11,080,302.

(Continued)

(51) Int. Cl.
*G06F 16/28* (2019.01)
*G06F 16/248* (2019.01)
(Continued)

(52) U.S. Cl.
CPC .......... *G06F 16/285* (2019.01); *G06F 16/248* (2019.01); *G06F 16/2455* (2019.01);
(Continued)

(58) Field of Classification Search
CPC ............... G06F 16/285; G06F 16/2455; G06F 16/24573; G06F 16/24575;
(Continued)

(56) References Cited

U.S. PATENT DOCUMENTS 7,478,091 B2 1/2009 Mojsilovic et al.
7,647,309 B1 1/2010 Bar
(Continued)

FOREIGN PATENT DOCUMENTS

CN 102667768 A 9/2012
CN 102968480 A 3/2013
(Continued)

OTHER PUBLICATIONS

Notice of Allowability Received for U.S. Appl. No. 15/290,283, dated Jun. 25, 2021, 2 Pages.
(Continued)

*Primary Examiner* — Aleksandr Kerzhner
*Assistant Examiner* — Aryan D Toughiry
(74) *Attorney, Agent, or Firm* — Shook, Hardy & Bacon LLP

(57) ABSTRACT

Systems and methods generate browse node pages. A combination of a category and one or more aspects is identified by analyzing historical user behavior data associated with a network-based system. A determination is made regarding whether existing browse node pages for the network-based system includes a browse node page for the identified combination. Each browse node page for the network-based system is accessible by a respective uniform resource location (URL) and provides a grouping of items in a respective category with one or more respective aspects. Based on a determination that a browse node page does not exist for the identified combination of the category and the one or more aspects, a browse node page for the identified combination is generated. The generated browse node page corresponds with a URL and provides items matching the identified combination of the category and the one or more aspects.

20 Claims, 18 Drawing Sheets

Related U.S. Application Data

(60) Provisional application No. 62/343,646, filed on May 31, 2016.

(51) Int. Cl.
| | |
|---|---|
| *G06F 16/2455* | (2019.01) |
| *G06F 16/2457* | (2019.01) |
| *G06F 16/951* | (2019.01) |
| *G06Q 30/06* | (2012.01) |
| *G06Q 30/0601* | (2023.01) |

(52) U.S. Cl.
CPC .. *G06F 16/24573* (2019.01); *G06F 16/24575* (2019.01); *G06F 16/24578* (2019.01); *G06F 16/951* (2019.01); *G06Q 30/0625* (2013.01); *G06Q 30/0601* (2013.01)

(58) Field of Classification Search
CPC ............. G06F 16/24578; G06F 16/248; G06F 16/951; G06Q 30/0625; G06Q 30/0601
See application file for complete search history.

(56) References Cited

U.S. PATENT DOCUMENTS

| | | | |
|---|---|---|---|
| 8,463,769 | B1 | 6/2013 | Enderton |
| 9,489,461 | B2 | 11/2016 | Sundaresan |
| 2006/0122994 | A1 | 6/2006 | Kapur et al. |
| 2008/0091711 | A1 | 4/2008 | Snodgrass et al. |
| 2008/0270356 | A1 | 10/2008 | Anderson et al. |
| 2011/0071925 | A1 | 3/2011 | Milton |
| 2011/0265011 | A1 | 10/2011 | Taylor et al. |
| 2012/0078709 | A1 | 3/2012 | Dunham et al. |
| 2012/0310973 | A1 | 12/2012 | Zhong et al. |
| 2012/0317120 | A1 | 12/2012 | Zhong et al. |
| 2013/0144871 | A1 | 6/2013 | Xia et al. |
| 2013/0173395 | A1 | 7/2013 | Gottschlich et al. |
| 2014/0046756 | A1 | 2/2014 | Wang et al. |
| 2014/0105489 | A1 | 4/2014 | Chittar et al. |
| 2014/0214813 | A1 | 7/2014 | Braham et al. |
| 2014/0282118 | A1 | 9/2014 | Kumamoto |
| 2014/0379498 | A1 | 12/2014 | Hansen |
| 2015/0081679 | A1 | 3/2015 | Gyanchand et al. |
| 2016/0085742 | A1 | 3/2016 | Mahmud et al. |
| 2016/0148295 | A1 | 5/2016 | Enderton |
| 2016/0275945 | A1 | 9/2016 | Elisha et al. |
| 2016/0314205 | A1 | 10/2016 | Davis |
| 2017/0344615 | A1 | 11/2017 | Islam et al. |
| 2017/0344622 | A1 | 11/2017 | Islam et al. |

FOREIGN PATENT DOCUMENTS

| | | |
|---|---|---|
| WO | 2017/210192 A1 | 12/2017 |
| WO | 2017/210207 A1 | 12/2017 |

OTHER PUBLICATIONS

Office Action Received for Korean Patent Application No. 10-2018-7037847, dated Dec. 26, 2019, 15 pages (7 pages of Official Copy & 8 pages of English Translation).
Office Action Received for Korean Patent Application No. 10-2018-7037876, dated Jan. 10, 2020, 12 pages (6 pages of Official Copy & 6 pages of English Translation).
Notice of Allowance received for U.S. Appl. No. 15/290,283, dated Mar. 19, 2021, 9 Pages.
Advisory Action Received for U.S. Appl. No. 15/290,283, dated Oct. 17, 2019, 3 pages.
Decision on Pre Appeal Brief Received for U.S. Appl. No. 15/290,283, mailed on Jul. 31, 2020, 2 pages.
Final Office Action Received for U.S. Appl. No. 15/290,283, dated Aug. 7, 2019, 21 pages.
Final Office Action Received for U.S. Appl. No. 15/290,283, dated Dec. 1, 2020, 28 Pages.
First Action Interview—Pre-Interview Communication received for U.S. Appl. No. 15/290,283, dated Aug. 31, 2018, 5 pages.
First Action Interview—Office Action Summary received for U.S. Appl. No. 15/290,283 dated Nov. 30, 2018, 4 pages.
Non Final Office Action Received for U.S. Appl. No. 15/290,283, dated Aug. 27, 2020, 25 pages.
Non Final Office Action Received for U.S. Appl. No. 15/290,283, dated Mar. 19, 2020, 23 pages.
U.S. Appl. No. 15/290,283, filed Oct. 11, 2016, Issued.
Final Office Action Received for Korean Patent Application No. 10-2018-7037847, dated Apr. 7, 2020, 7 pages (4 pages of Official Copy and 3 pages of English Translation).
International Written Opinion received for PCT Patent Application No. PCT/US2017/035029, dated Aug. 10, 2017, 6 pages.
International Search Report received for PCT Patent Application No. PCT/US2017/035029, dated Aug. 10, 2017, 3 Pages.
Office Action Received for Korean Patent Application No. 10-2018-7037876, dated Sep. 28, 2020, 8 pages (4 pages of English Translation and 4 pages of Official copy).
International Preliminary Report on Patentability received for PCT Application No. PCT/US2017/035029, dated Dec. 13, 2018, 8 pages.
Written Opinion received for PCT Patent Application No. PCT/US2017/035004 dated Aug. 24, 2017, 7 pages.
International Search Report received for PCT Patent Application No. PCT/US2017/035004, dated Aug. 24, 2017, 2 pages.
International Preliminary Report on Patentability received for PCT Application No. PCT/US2017/035004, dated Dec. 13, 2018, 9 pages.
Extended European Search Report Received for European Patent Application No. 17807339.1, dated Oct. 24, 2019, 8 pages.
Final Office Action Received for U.S. Appl. No. 15/608,767, dated Nov. 21, 2019, 19 pages.
Communication Pursuant to Article 94(3) EPC received for European Patent Application No. 17807331.8, dated Apr. 14, 2021, 10 pages.
First Action Interview—OA Summary received for U.S. Appl. No. 15/608,767, dated Apr. 11, 2019, 4 pages.
Extended European Search Report Received for European Patent Application No. 17807331.8, dated Oct. 24, 2019, 8 pages.
First Action Interview—Pre-Interview Communication received for U.S. Appl. No. 15/608,767, dated Dec. 31, 2018, 6 pages.
Communication Pursuant to Article 94(3) EPC received for European Patent Application No. 17807339.1, dated Apr. 14, 2021, 10 pages.
Summons to Attend Oral Proceedings Received for European Patent Application No. 17807331.8, mailed on Sep. 20, 2022, 13 Pages.
Office Action Received for Chinese Patent Application No. 201780033424.X, dated Nov. 2, 2022, 8 pages (Official copy only).
Powell et al., "Towards Next Generation URLs", Retrieved from the Internet URL<<https://web.archive.org/web/20111222020113/ http://www.port80software.com/support/articles/nextgenerationurls. asp>>, Dec. 22, 2011, pp. 1-4.

IDENTIFYING MISSING BROWSE NODES

CROSS-REFERENCE TO RELATED APPLICATIONS

This patent application is a continuation of U.S. patent application Ser. No. 15/290,283, filed Oct. 11, 2016, which claims priority to U.S. Provisional Patent Application No. 62/343,646, filed May 31, 2016. Each of the aforementioned applications is incorporated herein by reference in its entirety.

TECHNICAL FIELD

The subject matter disclosed herein generally relates to the processing of data. Specifically, in some example embodiments, the present disclosure addresses systems and methods for identifying missing browse nodes.

BRIEF DESCRIPTION OF THE DRAWINGS

Some embodiments are illustrated by way of example and not limitation in the figures of the accompanying drawings.

DETAILED DESCRIPTION

Figure 1:
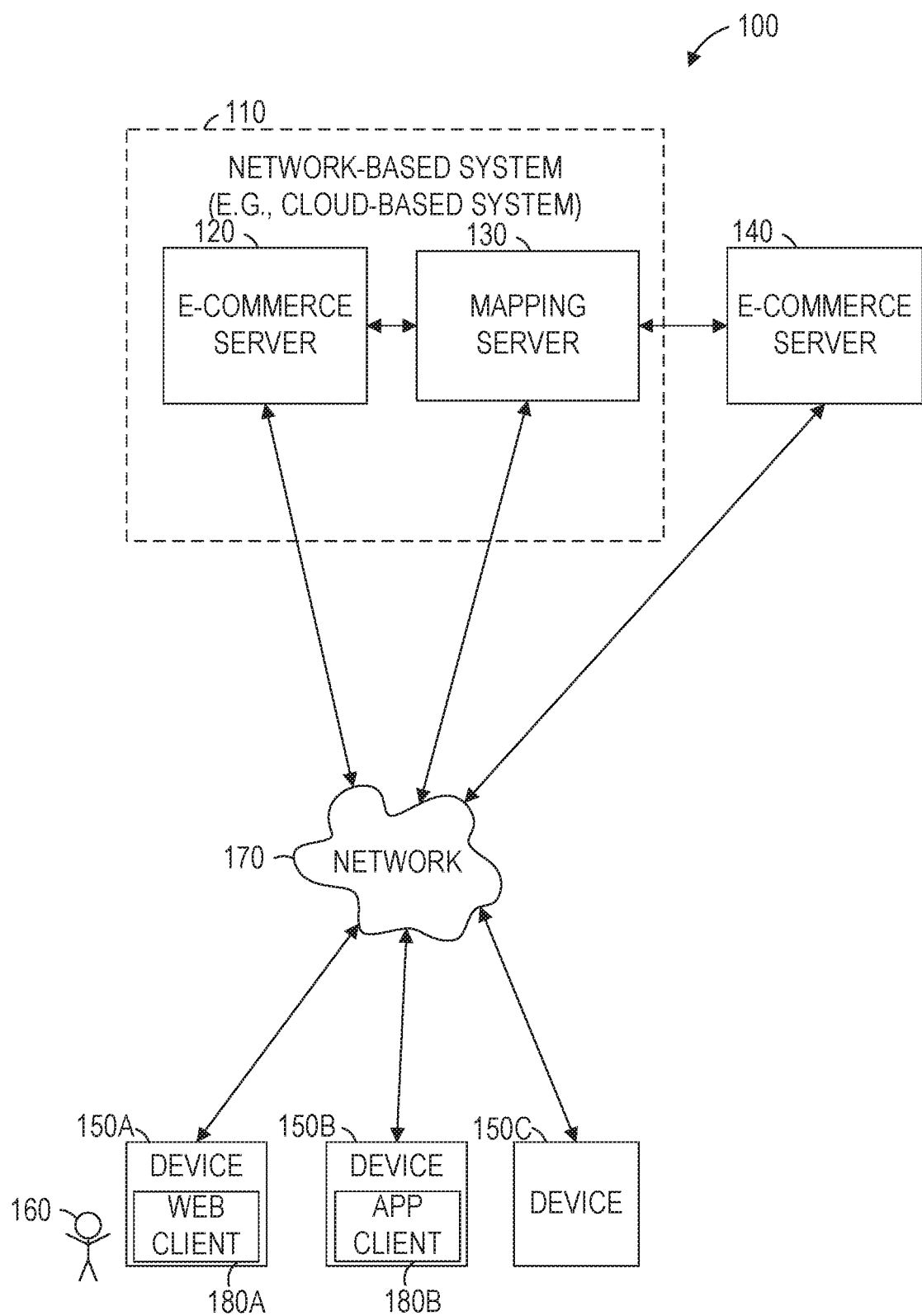
FIG. 1 is a network diagram illustrating a network environment suitable for identifying missing browse nodes, according to some example embodiments.

Example methods and systems are directed to identifying missing browse nodes. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An aspect is an attribute that can be used to filter search results, stored as a key/value pair. Aspects are distinct from the content of the search result (e.g., text or images displayed in the search result) and from the category of the search result. Categories are organized in a tree structure, with each search result belonging to at most one leaf node of the tree. By contrast, each search result may be associated with multiple aspects. For example, "brand=nike" and "condition=new" may both be associated with a single item. For clarity, the term "aspect type" may be used to refer to the key of the key/value pair and "aspect value" used to refer to the value.

A browse node is a particular grouping of items that can be browsed by users. In some example embodiments, a browse node is distinguished from a search results page by virtue of hypertext markup language (HTML) tags in the served page, features of the uniform resource locator (URL) of the served page, or both. For example, a search results page may have a URL that indicates the search query terms as arguments to a common gateway interface (CGI) script while a browse node page may have a URL that indicates the search query terms as part of the path portion of the URL. As another example, a search results page may have a general title (e.g., using a <TITLE> or <H1> HTML tag) that is used for many search queries while a browse node page (e.g., an HTML document) may have a title that specifically reflects the browse node.

A user may submit a search query to a search engine (e.g., a search application running on an application server). The search engine may process the search query and generate a set of results. Results generated by different search engines for the same search query may be different. For example, one search engine may be geared to providing image results while another is geared to providing shopping results. Continuing with this example, submitting a search query comprising "purse" to the two engines could result in an image of a purse from the first engine and a link to a purse retailer from the second engine.

The search query may have been run before by other users, and the actions of the other users taken in response to receiving a result set for the search query may have been recorded. For example, a database of prior user actions taken after the other users submitted the search query may have been created. The actions of the other users may be used to label aspects in the current search query. For example, if the search query is "digital camera nikon," and many users that used that search query refined the search to be for items having an aspect of "brand=nikon" in a category of "Cameras & Photo>Digital Cameras," the query of "digital camera nikon" may be labeled with the aspect "brand=Nikon."

Additionally or alternatively, prior searches by the current user may be used to label aspects of the current search query. For example, the search query may have been run before by the same user, and the action of the user taken in response to receiving a result set for the previous use of the search query may have been recorded. The previous action of the user may be used to label aspects in the current search query.

In some example embodiments, the context of the search is used to label aspects of the current search query. Context refers to the manner in which the query is made, rather than the query itself. For example, the user's device, web browser, application, and operating system all provide context. Other elements of context include the date, day of the week, and time of day of submission of the query, as well as current events (e.g., recent news stories or sporting events). The previous actions of users using the same context may be used to label aspects in the current search query.

To improve the user experience, browse nodes for popular combinations of categories and aspects are desirable. When a particular combination of category and aspects is found to have been requested at a frequency that exceeds a threshold, the existence of a browse node for that combination is checked and, if the browse node is missing, a request to create the browse node is generated. In some example embodiments, an entire set of missing browse nodes is generated based on recognition of a pattern of category and aspect combinations being requested.

FIG. 1 is a network diagram illustrating a network environment 100 suitable for identifying missing browse nodes, according to some example embodiments. The network environment 100 includes e-commerce servers 120 and 140, a mapping server 130, and devices 150A, 150B, and 150C, all communicatively coupled to each other via a network 170. The devices 150A, 150B, and 150C may be collectively referred to as "devices 150," or generically referred to as a "device 150." The e-commerce server 120 and the mapping server 130 may be part of a network-based system 110. Alternatively, the devices 150 may connect to the mapping server 130 directly or over a local network distinct from the network 170 used to connect to the e-commerce server 120 or 140. The e-commerce servers 120 and 140, the mapping server 130, and the devices 150 may each be implemented in a computer system, in whole or in part, as described below with respect to FIGS. 17-18.

The e-commerce servers 120 and 140 provide an electronic commerce application to other machines (e.g., the devices 150) via the network 170. The e-commerce servers 120 and 140 may also be connected directly to, or integrated with, the mapping server 130. In some example embodiments, one e-commerce server 120 and the mapping server 130 are part of the network-based system 110, while other e-commerce servers (e.g., the e-commerce server 140) are separate from the network-based system 110. The electronic commerce application may provide a way for users to buy and sell items directly to each other, to buy from and sell to the electronic commerce application provider, or both.

Also shown in FIG. 1 is a user 160. The user 160 may be a human user (e.g., a human being), a machine user (e.g., a computer configured by a software program to interact with the devices 150 and the mapping server 130), or any suitable combination thereof (e.g., a human assisted by a machine or a machine supervised by a human). The user 160 is not part of the network environment 100, but is associated with the devices 150 and may be a user of the devices 150. For example, the device 150 may be a sensor, a desktop computer, a vehicle computer, a tablet computer, a navigational device, a portable media device, or a smart phone belonging to the user 160.

In some example embodiments, the mapping server 130 receives a search query from a user. The mapping server 130 modifies the search query to include aspects, removes terms from the search query, or both. The resulting search query is sent to the e-commerce server 120 or 140, which generates a result list for the user. Alternatively, if the search query corresponds to a browse node, the browse node is provided to the user instead of a result list.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 17-18. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 170 may be any network that enables communication between or among machines, databases, and devices (e.g., the mapping server 130 and the devices 150). Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
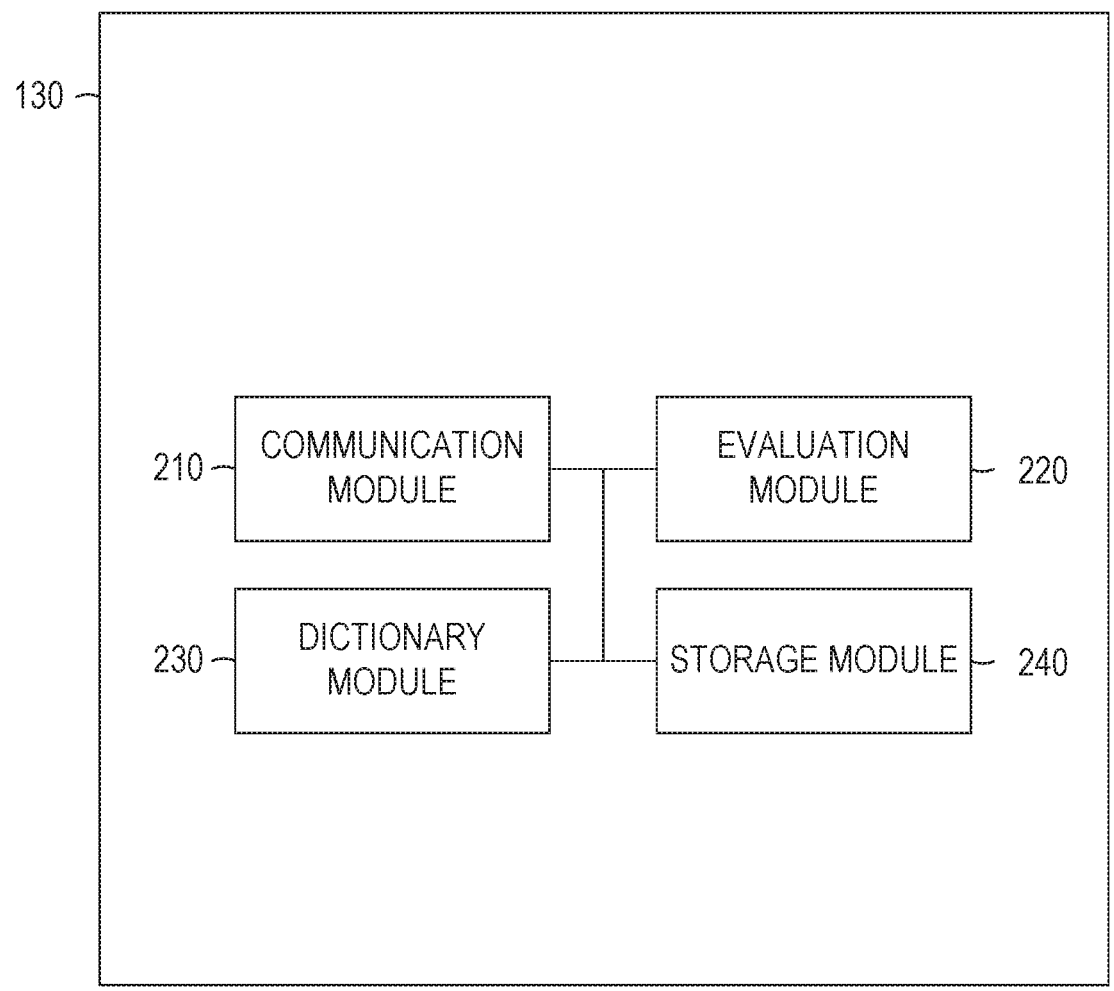
FIG. 2 is a block diagram illustrating components of a mapping server suitable for identifying missing browse nodes, according to some example embodiments.

FIG. 2 is a block diagram illustrating components of the mapping server 130, according to some example embodiments. The mapping server 130 is shown as including a communication module 210, an evaluation module 220, a dictionary module 230, and a storage module 240, all configured to communicate with each other (e.g., via a bus, shared memory, a switch, or application programming interfaces (APIs)). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 is configured to send and receive data. For example, the communication module 210 may receive image data over the network 170 and send the received data to the evaluation module 220. The communication module 210 may receive a search query from the device 150. Upon receiving a search query, the communication module 210 may send the search query to the dictionary module 230 to label the query with aspects. For example, the search query received may be a query for items matching a search string.

The evaluation module 220 is configured to create a dictionary that associates search queries with corresponding aspects. For example, a dictionary entry for "nike shoes" that associates the query with the aspect "brand=nike" may be created. The evaluation module 220 may use the storage module 240 to retrieve one or more search queries related to the search query (e.g., "nike shoes"). Based on previous user activity after running the search query, categories (e.g., "shoes" in the Clothing category), aspects (e.g., "shoes" offered for sale in auctions), or any suitable combination thereof may be identified and associated with the search query in the dictionary.

A search result may have both aspects and categories. As an example, consider a search result that is a listing for a particular pair of shoes. The shoes may belong to the category of Clothing, while the listing may have the aspect of being an auction. As another example, consider a search result that is a web page including an article about economic policy. The article may belong to the category of Economics, while the mode of presentation of the article—an aspect of the search result—is a web page.

The dictionary module 230 is configured to look up a substitute query for an input query. For example, the dictionary module 230 may receive the search query from the communication module 210, and access a database to identify the substitute query. Building on the example above, a search for "nike shoes" may be replaced by a query for all items in the "Clothing>Shoes" category with the aspect "brand=nike." The communication module 210 may send the substitute query to the e-commerce server 120 or 140 for generation of search results to be sent to the user. In some example embodiments, the dictionary lookup for a query returns an identifier for a browse node. The identifier for the browse node is sent to the e-commerce server 120 or 140, which sends the browse node to the device 150 for display to the user.

The storage module 240 may store data regarding prior searches by the querying user and other users for the evaluation module 220, store aspect lookup data for the dictionary module 230, or both. For example, historical query data, user modeling data, context modeling data, and query modeling data may all be stored by the storage module 240. Additionally or alternatively, the storage module 240 may access data storage on other devices, such as an external database.

Figure 3:
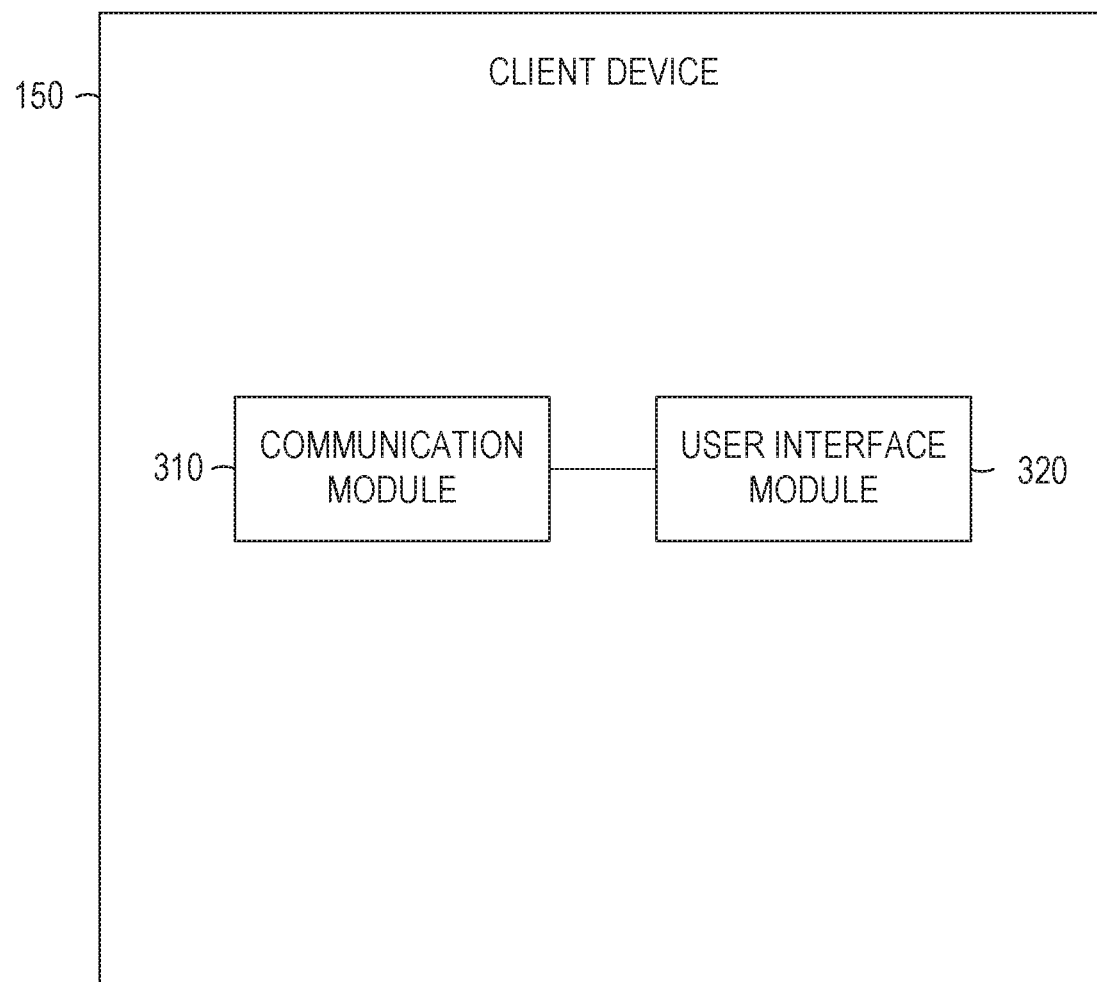
FIG. 3 is a block diagram illustrating components of a client device suitable for submitting a query and displaying results, according to some example embodiments.

FIG. 3 is a block diagram illustrating components of a device 150 suitable for submitting a query and displaying results and browse nodes, according to some example embodiments. The device 150 is shown as including a communication module 310 and a user interface module 320, configured to communicate with each other (e.g., via a bus, shared memory, or a switch).

The communication module 310 may communicate with the e-commerce server 120 or 140, the mapping server 130, or any suitable combination thereof. Information received via the communication module 310 may be presented (e.g., displayed on a display device) via the user interface module 320. Information may be selected or search queries may be entered by a user using a user interface presented by the user interface module 320. The search queries may be communicated to the e-commerce server 120, 140 or the mapping server 130 via the communication module 310. The communication module 310 may receive a response from the e-commerce server 120, 140 or the mapping server 130 that includes a set of results. The search results may be presented to the user by the user interface module 320. For example, the search results may be presented in a list view or a gallery view. Similarly, a browse node may be presented that provides a customized view for the data instead of a generic result list.

Figure 4:
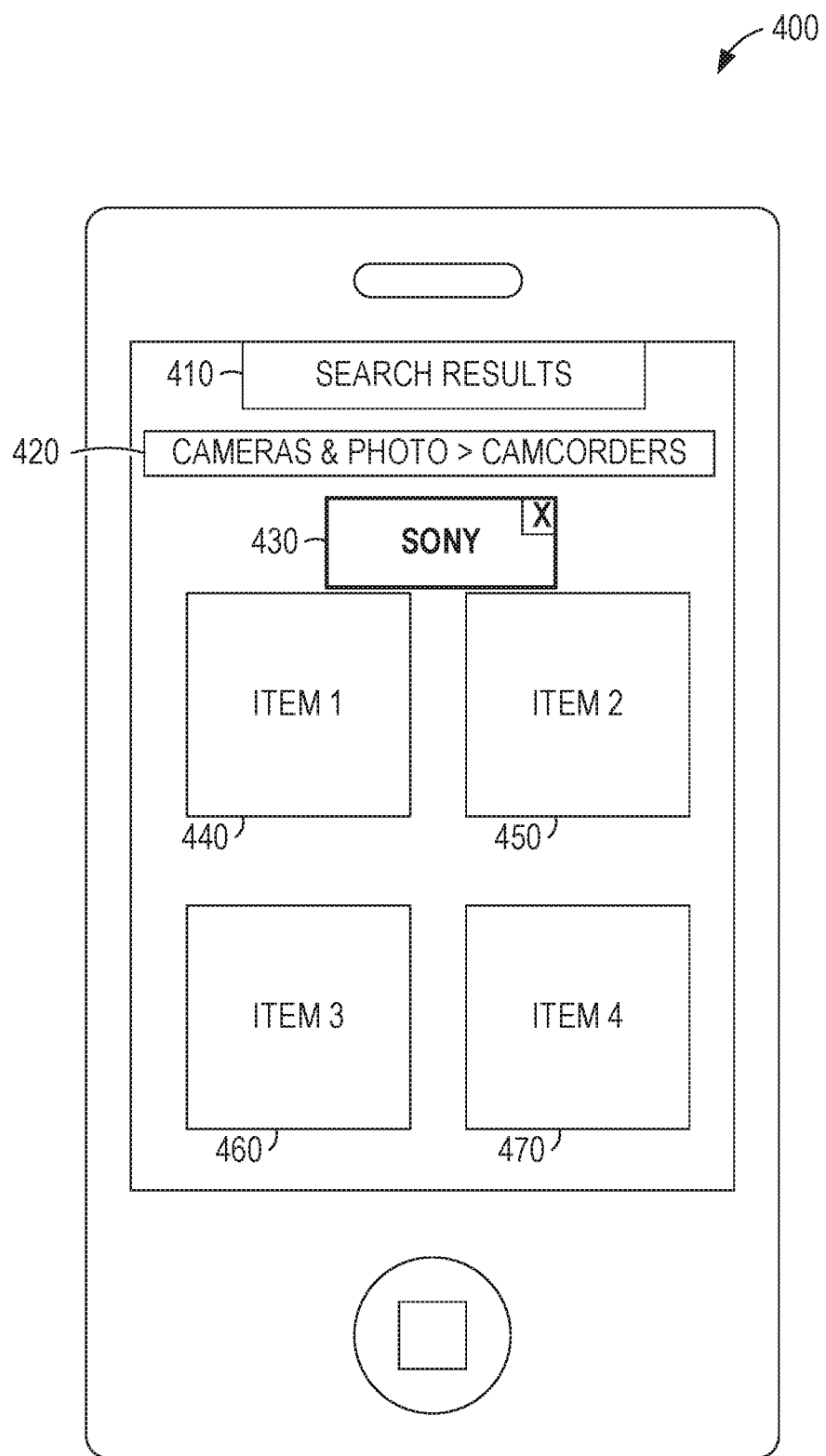
FIG. 4 is a block diagram illustrating a user interface suitable for displaying search results, according to some example embodiments.

FIG. 4 is a block diagram illustrating a user interface 400 suitable for presenting search results, according to some example embodiments. As can be seen in FIG. 4, the user interface 400 includes a title 410, "Search Results"; a category 420; an aspect 430; and four search results 440-470.

The user interface 400 may be displayed in response to a user query. For example, if the user enters a query for "song camera" on a device 150, the query may be transmitted from the device 150 to the mapping server 130. The mapping server 130 replaces the query phrase with a search for all items having the aspect of "brand=sony" in the sub-category of "camcorders" in the category of "cameras & photo." The e-commerce server 120 or 140 executes the replacement query and sends the search results 440-470 to the device 150 for display to the user.

Each search result 440-470 may be operable to view additional information about the search result. For example, a search result may be an item for sale and the initial search result screen may show an image of the item and a label. Clicking on or otherwise activating the image of the item may result in a new page being displayed that shows additional information about the item, such as an item description, additional images, a price, and so on.

The results may include items, events, locations, people, and so on. Items may be items for sale or items that are wanted for purchase. Events may be concerts; festivals; movies, sporting events, and the like. Locations may be monuments, stores, gas stations, restaurants, stadiums, and the like. People may be friends of the user, celebrities, or other people. In some example embodiments, one or more of the items, events, locations, or people displayed are chosen based on an advertising fee paid.

Figure 5:
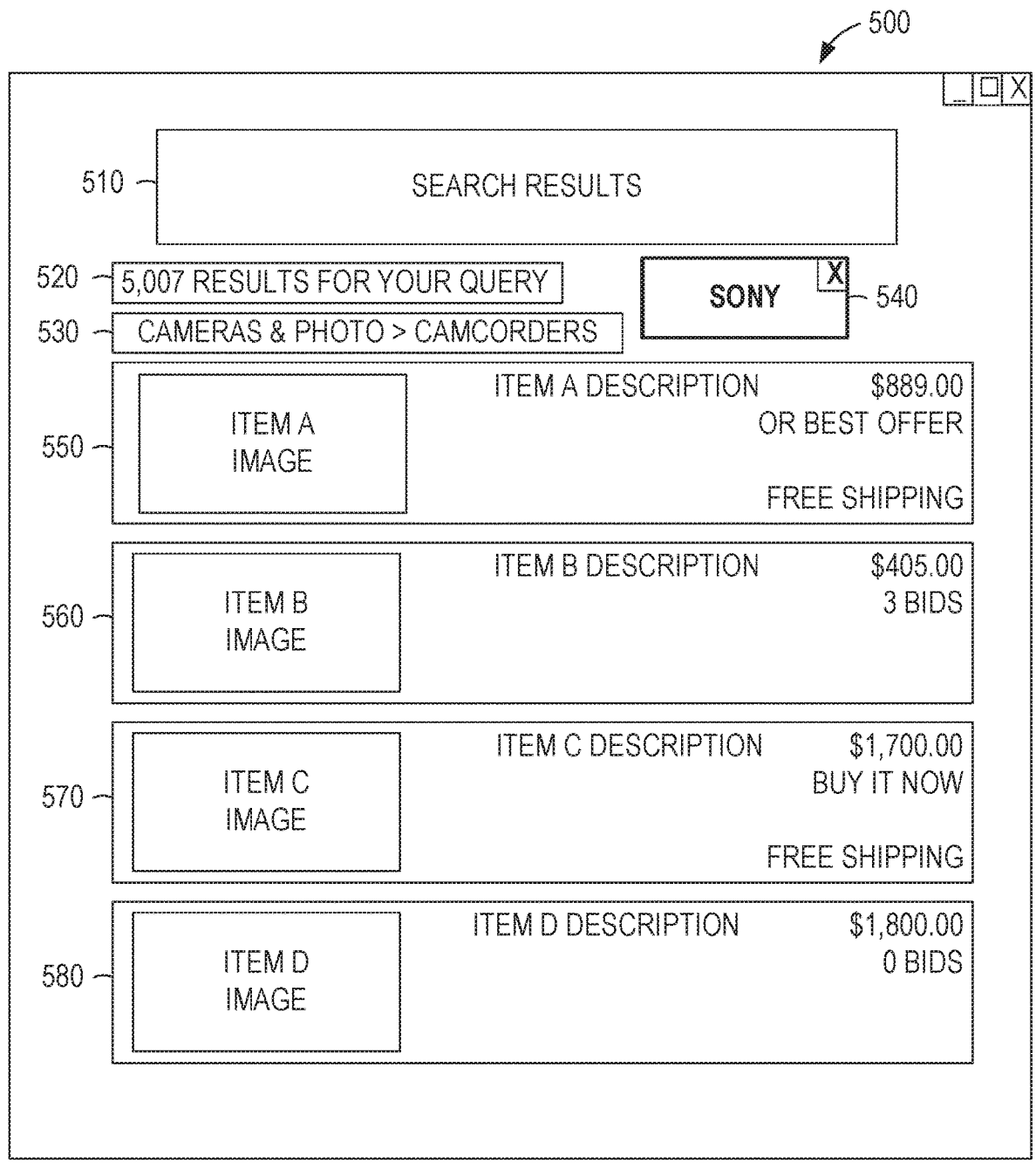
FIG. 5 is a block diagram illustrating a user interface suitable for displaying search results, according to some example embodiments.

FIG. 5 is a screen diagram illustrating a user interface 500 suitable for presenting search results, according to some example embodiments. As can be seen in FIG. 5, the user interface 500 includes a title 510, "Search Results"; a result count 520; a category 530; an aspect 540; and four search results 550-580. The user interface 500 may be presented to a user viewing search results on a device with a larger screen, while the user interface 400 may be presented on a device having a smaller screen. The additional screen area may allow for the presentation of the result count 520 as well as additional information in the search results 550-580. For example, the user interface 500 includes a price and description of each search result 550-580, while in the example of FIG. 4 discussed above, only an image and label are shown for each search result 440-470.

Figure 6:
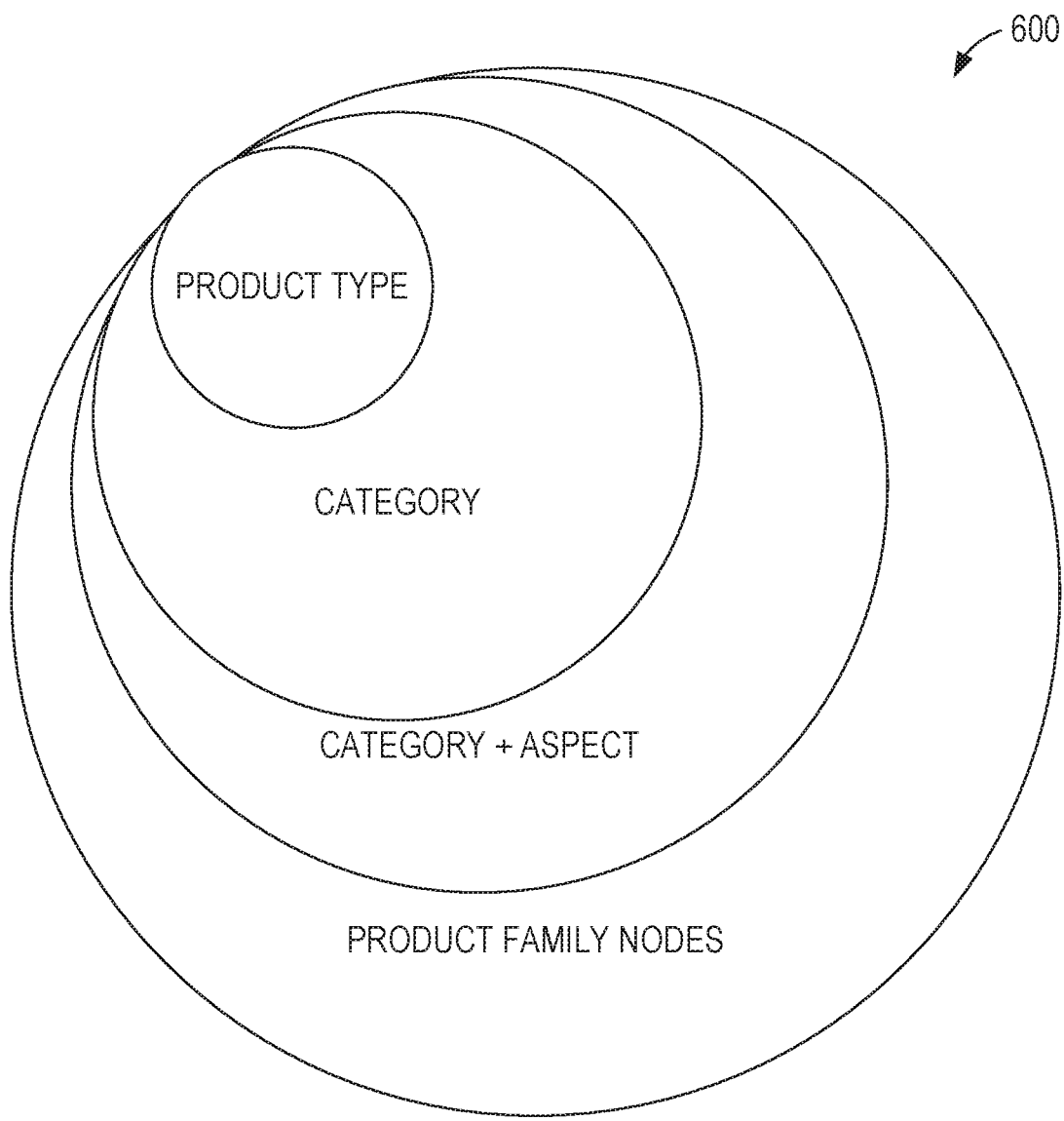
FIG. 6 is a block diagram illustrating a hierarchy of browse nodes, according to some example embodiments.

FIG. 6 is a block diagram 600 illustrating a hierarchy of browse nodes, according to some example embodiments. As shown in the block diagram 600, browse nodes may exist at different levels in the hierarchy. At the highest level, a user may view information for an entire product type. From the product type view, the user may drill down into categories and sub-categories. Within a category or sub-category, further browse nodes may exist for particular aspect values and combinations. For example, a browse node may be created for "brand=sony," "color=black," or both together. Due to the combinatorial explosion caused by the number of possible combinations of distinct aspects, it is often desirable to avoid creating browse nodes for every possible combination of aspects. For example, if aspects for brand, color, and size exist, and each aspect has 10 possible values (by no means an upper bound), then 1000 different browse nodes for the various combinations would need to be created in order to provide a browse node for each combination. Selective creation of browse nodes may provide most of the benefit with minimal cost. For example, if 10 browse nodes cover 80% of user interests, limiting the browse nodes to those 10 would provide 80% of the benefit with 1% of the cost of creating all 1000 browse nodes.

The aspect-limited browse nodes are further refined by product family nodes. A product family node contains a curated list of closely related items. For example, an aspect-limited browse node for the category of "Cameras & Photo>Film Photography>Film Cameras" with "brand=sony" and "color=black" would contain all items matching those criteria. As another example, a product family node for "Amazing Film Cameras" would contain a set of items fitting that criterion in the judgment of a curator.

The creation of browse nodes for particular category/aspect combinations may provide for a better browse experience. For example, browse nodes may be presented to users differently from ordinary aspect filters, allowing users to more easily find popular aspect sets for the currently browsed category. Additionally, browse nodes may improve ranking of the site in other search engines. For example, if a site provides a natural way for a web crawler to find every browse node, the browse node page for a particular category/aspect is likely to have a higher page rank than a search results page for the same combination.

Figure 7:
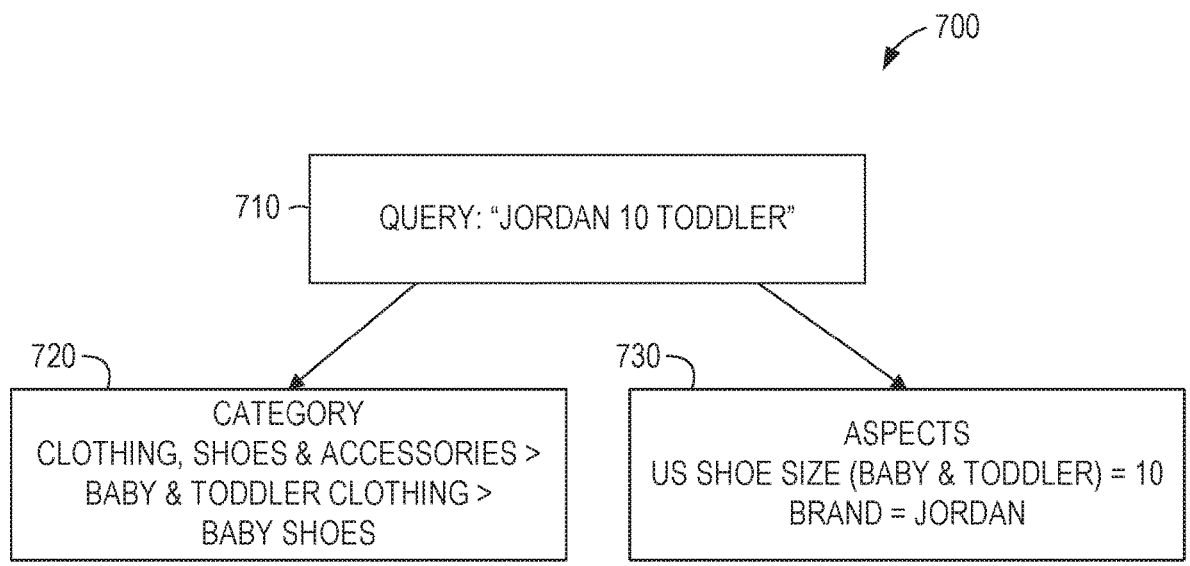
FIG. 7 is a block diagram illustrating an example relationship between an input query and its labeled aspects, according to some example embodiments.

FIG. 7 is a block diagram 700 illustrating an example relationship between an input query 710, a category 720, and labeled aspects 730, according to some example embodiments. In the example of FIG. 7, the input query is "Jordan 10 toddler." Based on interactions of other users after submitting this query, interactions of the current user after submitting this query, interactions of users in the same context as the current query, or any suitable combination thereof, the category 720 and labeled aspects 730 are determined. For example, a two-step process may be used. In the first step, the relationship between the query, a category, and a set of aspects are determined and stored in a dictionary. This process of mining past user interactions to create a dictionary may be performed periodically (e.g., daily or weekly). In the second step, at the time a user submits a query, the dictionary is accessed to identify a replacement query. In some example embodiments, both steps are performed at the time the query is received. Compared to two-step implementations in which the dictionary is pre-prepared, the runtime solution may consume more processing resources but provide better results.

In the example of FIG. 7, the resulting category 720 is "Clothing, Shoes & Accessories>Baby & Toddler Clothing>Baby Shoes." The resulting aspects 730 are "US Shoe Size (Baby & Toddler)=10" and "Brand=Jordan," Accordingly, when a user submits a general query for "Jordan 10 toddler," all results in the category 720 having the aspects 730 may be displayed to the user.

Figure 8:
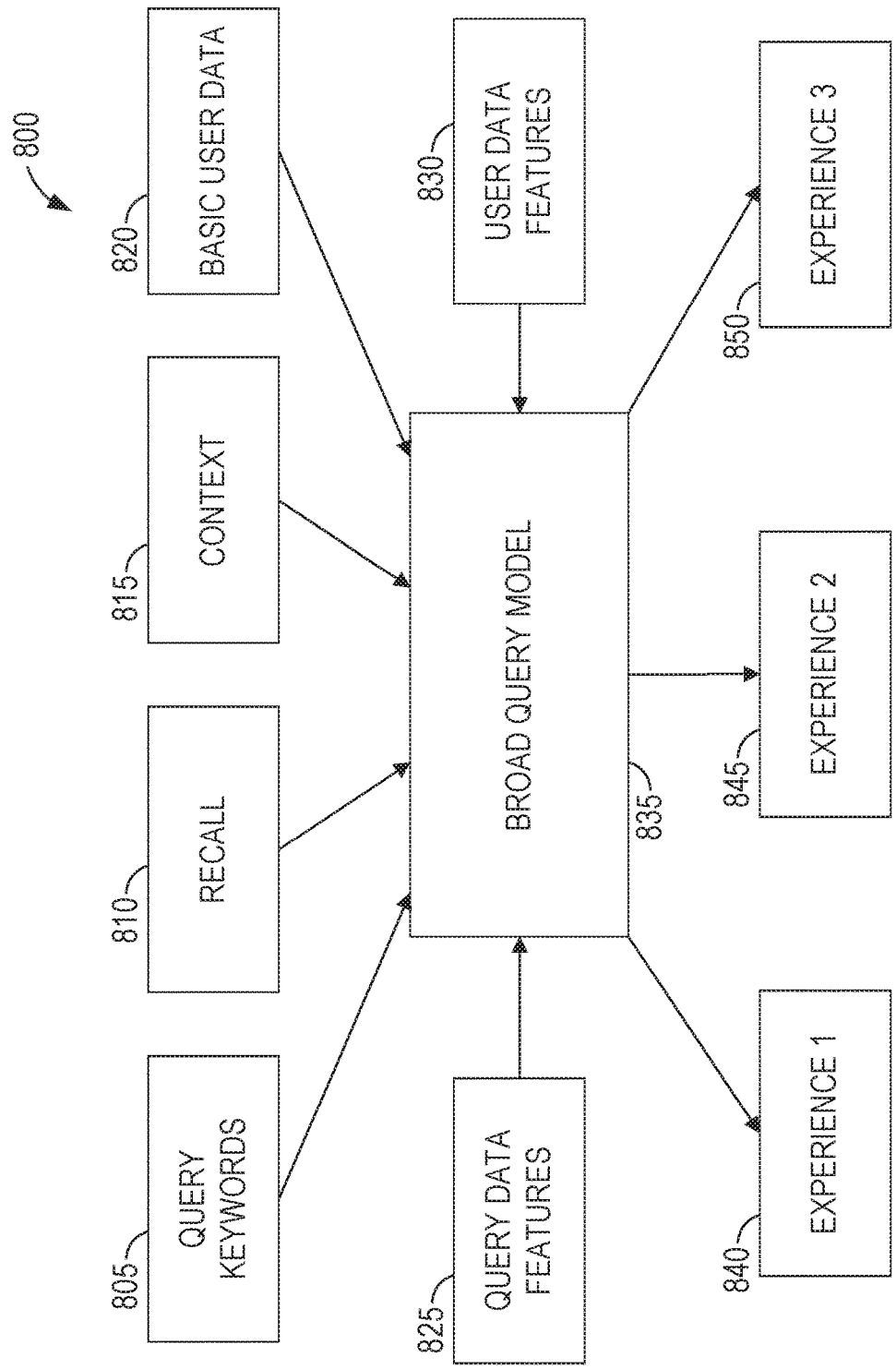
FIG. 8 is a block diagram illustrating factors suitable for identifying missing browse nodes, according to some example embodiments.

FIG. 8 is a block diagram 800 illustrating factors suitable for identifying missing browse nodes, according to some example embodiments. As shown in the block diagram 800, query keywords 805, recall 810, context 815, basic user data 820, query data features 825, and user data features 830 may be inputs into a broad query model 835. These inputs may be referred to collectively as inputs 805-830. The broad query model 835 may generate one or more experiences 840-850.

The query keywords 805 may be part of a search query submitted by the user. For example, a search query may be composed of a selected image and a plurality of keywords.

The recall 810 may include the result set generated for the user in response to the search query. Continuing with the example of a search query composed of an image and a plurality of keywords, the result set may include images similar to the selected image, articles containing one or more of the plurality of keywords, articles including the selected image, articles including images similar to the selected image, images with titles or metadata including one or more of the plurality of keywords, or results that are found to be relevant to the search in another way.

The context 815 may encompass any information about the circumstances under which the query is submitted. For example, the context 815 may include not only the search query and the user, but the browser being used, the time of day the query is submitted, which queries were submitted before the current query, and any other information about the circumstances under which the query is submitted.

The basic user data 820 can include information about the user submitting the query. For example, the basic user data 820 may include the user's name, age, address, gender, income level, education level, marital status, and any other information known about the user.

In some example embodiments, the query keywords 805, recall 810, context 815, and basic user data 820 are accessed by the broad query model 835 before information regarding the query data features 825 and the user data features 830 is accessed. In other example embodiments, input data elements are accessed by the broad query model 835 in a different order.

The query data features 825 include information based on the query. For example, a search commonly run by other users (or all users including the current user) after running the current search query would be a query data feature 825. To illustrate, a search for items having an aspect of "mode=digital" may frequently follow searches for "camera." Accordingly, the "mode=digital" aspect may be a query data feature 825 for the "camera" query.

The user data features 830 include information based on the user. For example, a modification commonly run by the current user to other queries may be a user data feature 830. To illustrate, the current user may frequently follow searches for items with the same search query limited to items available for immediate purchase (e.g., "Buy-It-Now" items). Accordingly, modifying a search to include the Buy-It-Now aspect may be a user data feature 830 for the user. The basic user data 820 and user data features 830 are similar in that they both involve data for a particular user. The distinction is that the basic user data 820 contains data intentionally provided directly by the user name, address, email address, and credit card number) while the user data features 830 contains data derived by the mapping server 130 or the e-commerce server 120, 140 based on actions taken by the user.

After considering the query data features 825 and the user data features 830 for the input query (including the query keywords 805), recall 810, context 815, and basic user data 820, the broad query model 835 may generate one or more experiences 840-850. In some example embodiments, each experience 840-850 is a browse node that includes one or more aspects. For example, the broad query model 835 may apply various weights to queries generated using the inputs 805-830 to generate the experiences 840-850. Based on the query data features 825, a search for items in the category of "Cameras & Photo" with the aspect of "mode=digital" may be generated. Based on the user data features 830, a search for items in the category of "Cameras & Photo" having the "Buy-It-Now" aspect may be generated. Based on weighting factors or a recommendation hierarchy, one of the generated searches may be used to provide results to the user. A combined recommendation of a search for items in the "Cameras & Photo" category having the "Buy-It-Now" aspect and the "mode=digital" aspect may also be generated. The combined recommendation may, based on the weighting factors or recommendation hierarchy, be used to provide results to the user. In other embodiments, different combinations of weighting factors or hierarchies may be used.

Accordingly, when a determined experience 840-850 is a browse node that has not yet been created, the mapping server 130 or the e-commerce server 120 or 140 may generate a request to create the corresponding browse node. The request may be handled by an administrator or result in automatic generation of the browse node.

Figure 9:
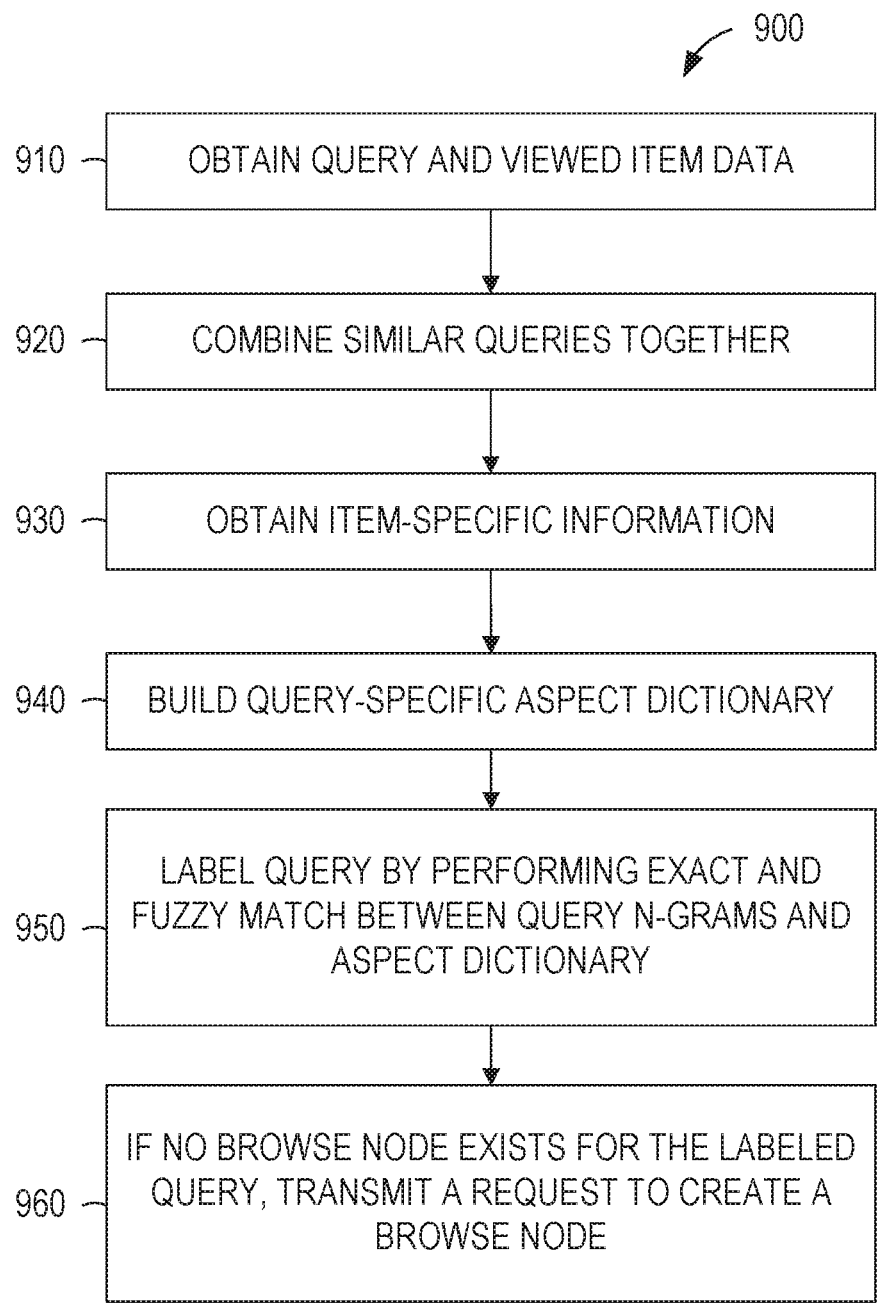
FIG. 9 is a flowchart illustrating operations of an application server in performing a method of identifying missing browse nodes, according to some example embodiments.

FIG. 9 is a flowchart illustrating operations of a mapping server 130 in performing a method 900 of identifying missing browse nodes, according to some example embodiments. Operations in the method 900 may be performed by the mapping server 130, using modules described above with respect to FIG. 2.

In operation 910, the evaluation module 220 obtains query and viewed item data. For example, the historical user behavior data of FIGS. 11-13 may be accessed to determine successful sessions that resulted from particular queries. In some example embodiments, viewing of an individual item shows that the session was successful. In various example embodiments, other measures of a successful session are used in place of viewed items. A successful session may be a session in which a user interacts with an item in any way (e.g., views the item, bids on the item, buys the item, subscribes to the item, etc.) or a session in which the user performs a particular interaction (e.g., bids on the item, buys the item, or both). An unsuccessful session is any session that is not successful according to the definition of success used by a particular embodiment. Other criteria may also be used to identify successful and unsuccessful sessions. Thus, the method 900 may be performed using other criteria for successful sessions, but is described below using viewed items.

The evaluation module 220 combines similar queries together in operation 920. Similarity between queries may be judged by a distance metric, and queries having a distance lower than a threshold are combined. For example, "nike shoes" and "shoes nike" are not identical queries, but a distance metric may show that the queries are similar because they contain the same words in a different order. Similarly, "dvd movie" and "dvd movies" are not identical queries, but a distance metric may show that the queries are similar because a word in one query is a plural of a word in another. In some example embodiments, combining the queries together causes items viewed for either query to be considered to have been viewed for both queries. In other example embodiments, combining the queries together causes items viewed for the similar queries to be considered to have been viewed for the most popular of the similar queries; the other similar queries are then disregarded.

In operation 930, the evaluation module 220 obtains item-specific information for the viewed items. For example, the category and aspects of each of the viewed items may be retrieved from the historical user behavior data. In some example embodiments, additional information for each item is obtained. For example, the title of the item, tags for the item provided by the seller, tags provided by the buyer, or any suitable combination thereof are obtained.

In operation 940, the dictionary module 230 builds a query-specific aspect dictionary. The query-specific aspect dictionary allows the lookup of aspects from a query. Various algorithms may be used to build the query-specific aspect dictionary. In some example embodiments, a percentage of items having each aspect viewed in response to the query is determined. The determined percentage is compared to a threshold, and, if the threshold is exceeded, the aspect is added to the dictionary. For example, if the threshold is 80% and 90% of the viewed items after a search for "nike shoes" have the aspect "brand=nike," then "brand=nike" would be added as an aspect for the query "nike shoes."

In operation 950, the dictionary module 230 applies the query-specific aspect dictionary to the query by performing exact and fuzzy matching between n-grams of the query and the aspect dictionary. That is, each query is made of terms; an n-gram is a subset of the query containing n terms. For example, a query for "nike shoes" includes two 1-grams ("nike" and "shoes") and one 2-gram ("nike shoes"). For exact matching, the three n-grams for the query are looked up in the aspect dictionary to identify corresponding aspects. For fuzzy matching, root stemming of the terms is also performed. For example, plural words are converted to singular form, suffixes (e.g., -ly and -ing) are stripped, and the like. The multiple lookups in the aspect dictionary provide multiple results.

N-grams are looked up starting with the longest n-grams first. As matching n-grams are found, the tokens in the n-gram are ignored for further searching. Once all n-grams have been used to identify aspects, a global aspect dictionary is updated to associate the identified aspects with the query. For n-grams of equal length, the popularity of the resulting aspect may be used. For example, a query for "levis belt buckle" in the "Men's Belt" category could map to either "brand=buckle" or "brand=Levi's," Since searches for "brand=Levi's" are more common in the "Men's Belt" category, that aspect could be prioritized. Had the user searched for "belt buckle" without including "levis," then, if further searches for "brand=buckle" exceeded a predetermined threshold, the aspect of "brand=buckle" could automatically be added to the query.

In some example embodiments, aspects are selected for labeling based on the usage patterns of the present user and other users. In some example embodiments, the aspects are generated based on advertising fees, promotions, seasons, etc. For example, a recommended search on St. Patrick's Day might add the word "color=green" to the search query. The mapping server 130 may also determine whether or not aspects should be provided at all. For example, if an aspect has already been applied to the search query, the mapping server 130 may decide to avoid applying another aspect to the query.

As another element for consideration, the level of a category in a category tree may be considered. For example, a narrow category near the bottom of a category tree may be preferred for labeling aspects while a broad category near the top of the category tree is not. Accordingly, in some example embodiments, an aspect is labeled only when the identified category is a narrow category, such as when, for example, the identified category is not within two levels of the root node of the category tree.

In operation 960, the evaluation module 220 of the mapping server 130 determines if a browse node exists for the labeled query. For example, the mapping server 130 may request a browse node for the labeled query from the e-commerce server 120 or 140 and receive an error message or null value in response, indicating that no browse node exists. If no browse node exists, the mapping server 130 transmits a request to the e-commerce server 120 or 140 to create the browse node.

Figure 10:
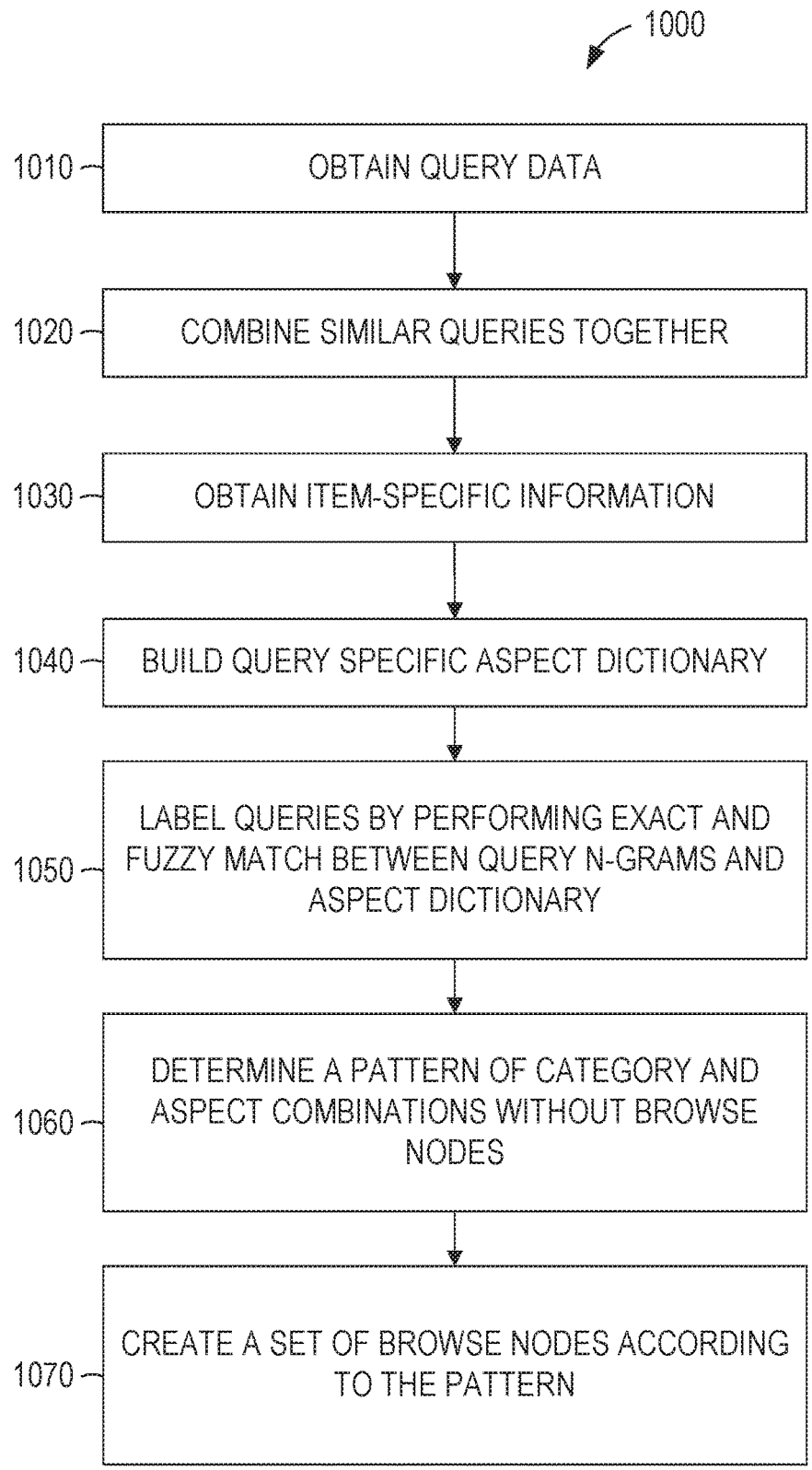
FIG. 10 is a flowchart illustrating operations of an application server in performing a method of creating missing browse nodes, according to some example embodiments.

FIG. 10 is a flowchart illustrating operations of a mapping server 130 in performing a method 1000 of creating missing browse nodes, according to some example embodiments. Operations in the method 1000 may be performed by the mapping server 130, using modules described above with respect to FIG. 2.

In operation 1010, the mapping server 130 obtains query data. For example, past queries such as those described in FIG. 11 may be obtained from a historical user behavior database or a query modeling database.

In operation 1020, the mapping server 130 combines similar queries together. For example, the query data may include each query received over a period of time and a count of the number of times the query was received. Similar queries may be combined by removing all but one of the similar queries and adding the count of the removed queries to the count of the remaining query. To illustrate, "Gucci bag," with a count of 100 occurrences, and "Gucci bags," with a count of 200 occurrences, may be found to be similar by using root stemming to determine that "bag" and "bags" are equivalent. The more popular query, "Gucci bags," may be kept and the less popular query discarded. Thus, after the similar queries are combined, "Gucci bags" with a count of 300 occurrences would remain and "Gucci bag" would no longer appear as a query.

Operations 1030-1050 mirror operations 930-950, described above. In operation 1030, the evaluation module 220 obtains item-specific information for the viewed items. In operation 1040, the dictionary module 230 builds a query-specific aspect dictionary. In operation 1050, the dictionary module 230 applies the query-specific aspect dictionary to the queries by performing exact and fuzzy matching between n-grams of the queries and the aspect dictionary.

In operation 1060, the evaluation module 220 identifies a pattern of category and aspect combinations without browse nodes. For example, in a "Cameras" category, many searches may be run for particular brands (e.g., "Nikon" or "Canon") in combination with particular media formats (e.g., "Micro SD," "Compact Flash," or "Memory Stick"). Based on the total of all such searches exceeding a threshold and at least one of the browse nodes not existing, the pattern of category and aspect combinations is identified. Thus, even though no single combination (such as "Nikon Micro SD") may exceed a threshold for browse node creation, the pattern as a whole may still be of sufficient interest to justify the creation of a set of browse nodes.

In operation 1070, the evaluation module 220 requests the e-commerce server 120 or 140 to create one or more browse nodes for the determined pattern. In some example embodiments, a browse node is created for each combination of the identified category and aspects. In other example embodiments, a second threshold is used to determine which combinations will have associated browse nodes created. For example, the ten most popular category/aspect combinations matching the pattern may have corresponding browse nodes created.

Figure 11:
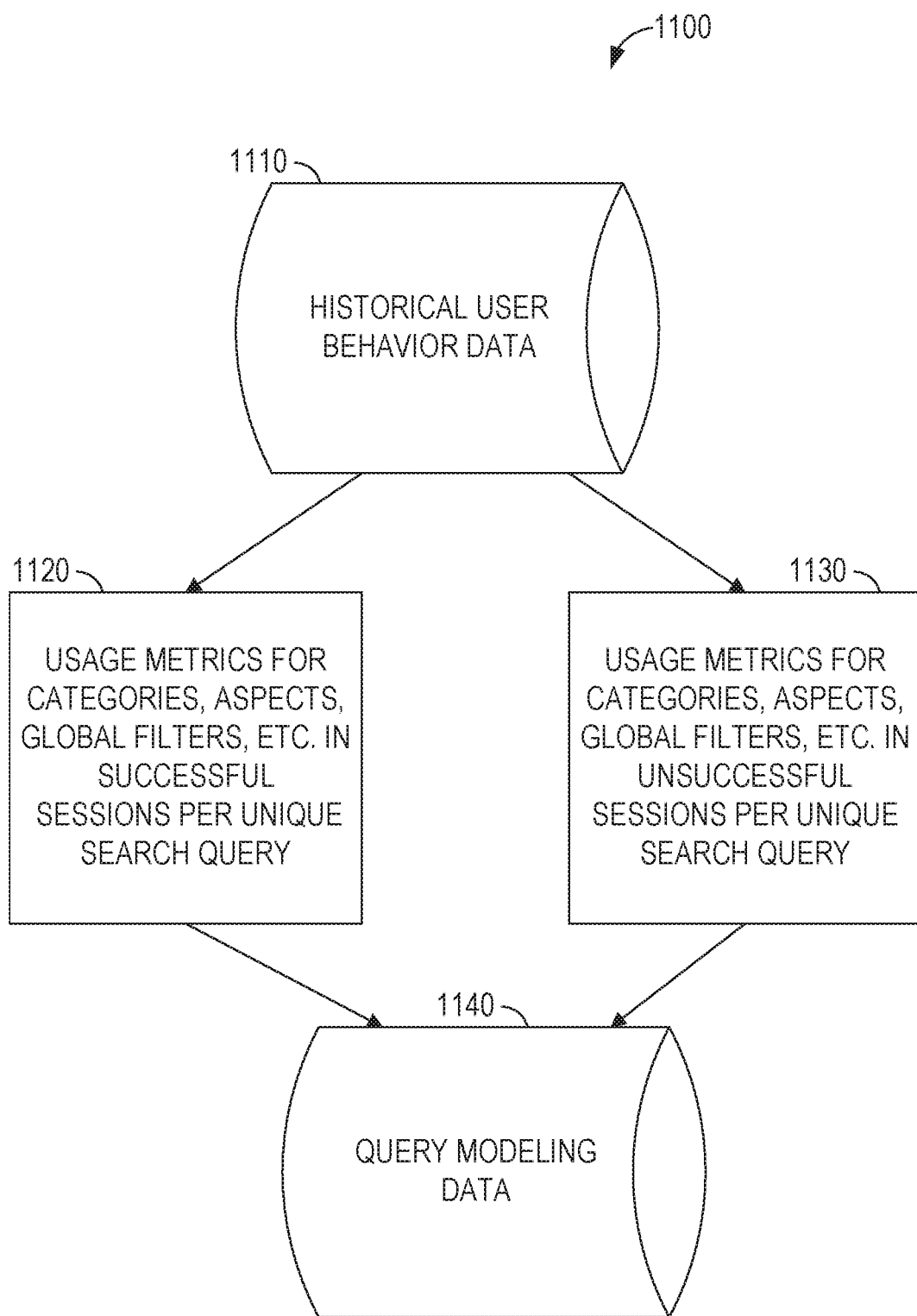
FIG. 11 is a block diagram illustrating the use of query data features in performing a method of labeling a query with aspects for use in identifying missing browse nodes, according to some example embodiments.

FIG. 11 is a block diagram 1100 illustrating the use of query data features in performing a method of labeling queries with aspects, according to some example embodiments. A database 1110 stores historical user behavior data, including data regarding the behavior of a number of users of the system. In one embodiment, data regarding the actions of all users are stored in the database 1110. From the historical user behavior data, usage metrics 1120 for categories, aspects, global filters, and the like in successful sessions for each unique search query may be extracted. Similarly, usage metrics 1130 for categories, aspects, global filters, and the like in unsuccessful sessions for each unique search query may be extracted. The usage metrics 1120 and 1130 may be used to model the categories, aspects, and global filters that may be desirable in future uses of the same query and stored in a database 1140 as query modeling data.

Figure 12:
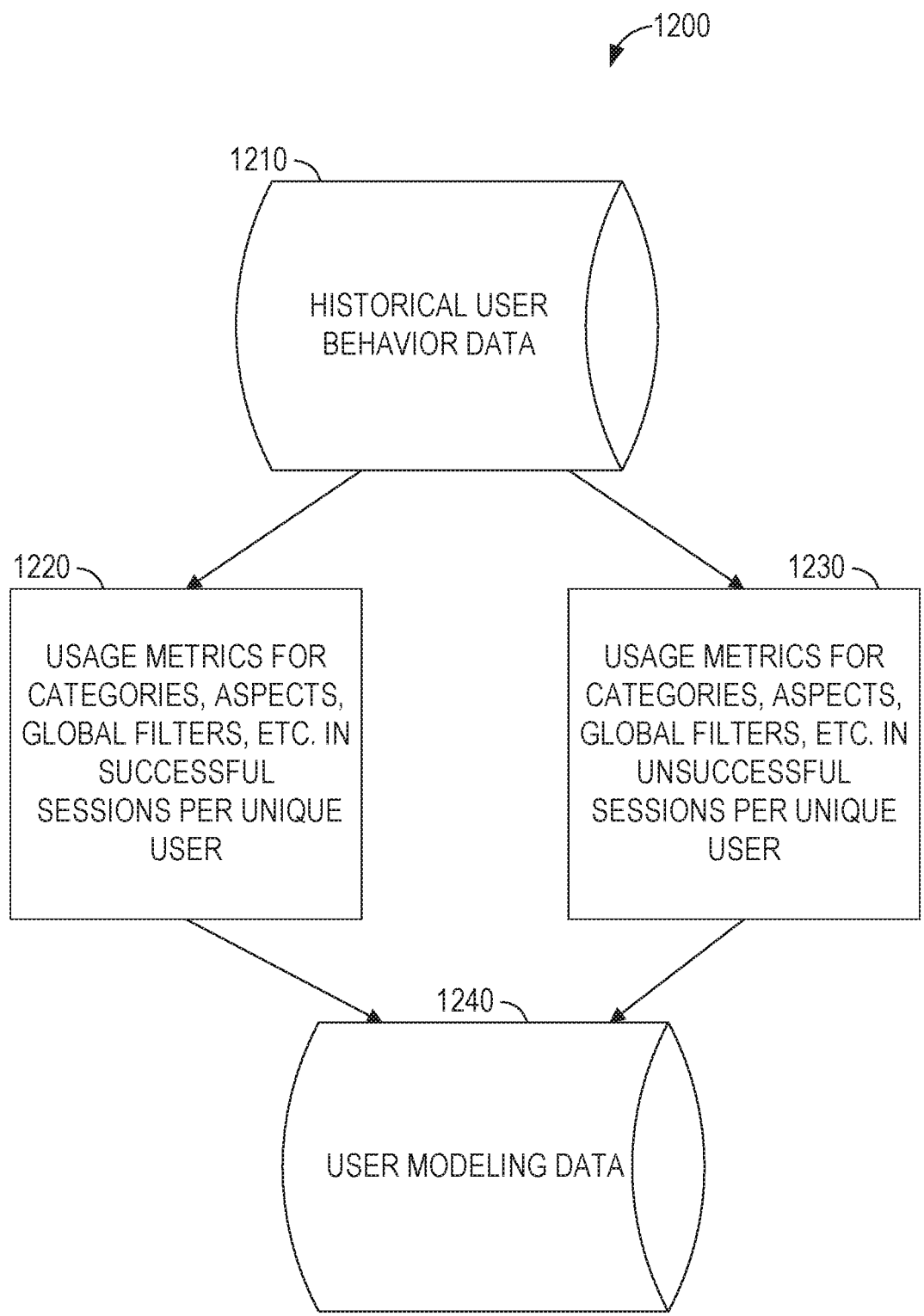
FIG. 12 is a block diagram illustrating the use of user data features in performing a method of labeling a query with aspects for use in identifying missing browse nodes, according to some example embodiments.

FIG. 12 is a block diagram 1200 illustrating the use of user data features in performing a method of labeling queries with aspects, according to some example embodiments. A database 1210 stores historical user behavior data, including search queries run by users and the sequence of actions stemming from each search query. For example, in a particular session, an initial search query may be run, then a category filter added, then another term added to the query, then an aspect filter added, then a first item viewed, then a second item viewed, and finally a bid placed on the second item. From the historical user behavior data, usage metrics 1220 for categories, aspects, global filters, and the like in successful sessions for each unique user may be extracted. Similarly, usage metrics 1230 for categories, aspects, global filters, and the like in unsuccessful sessions for each unique user may be extracted. The usage metrics 1220 and 1230 may be used to model the categories, aspects, and global filters that may be desirable in future queries by the same user and stored in a database 1240 as user modeling data.

Figure 13:
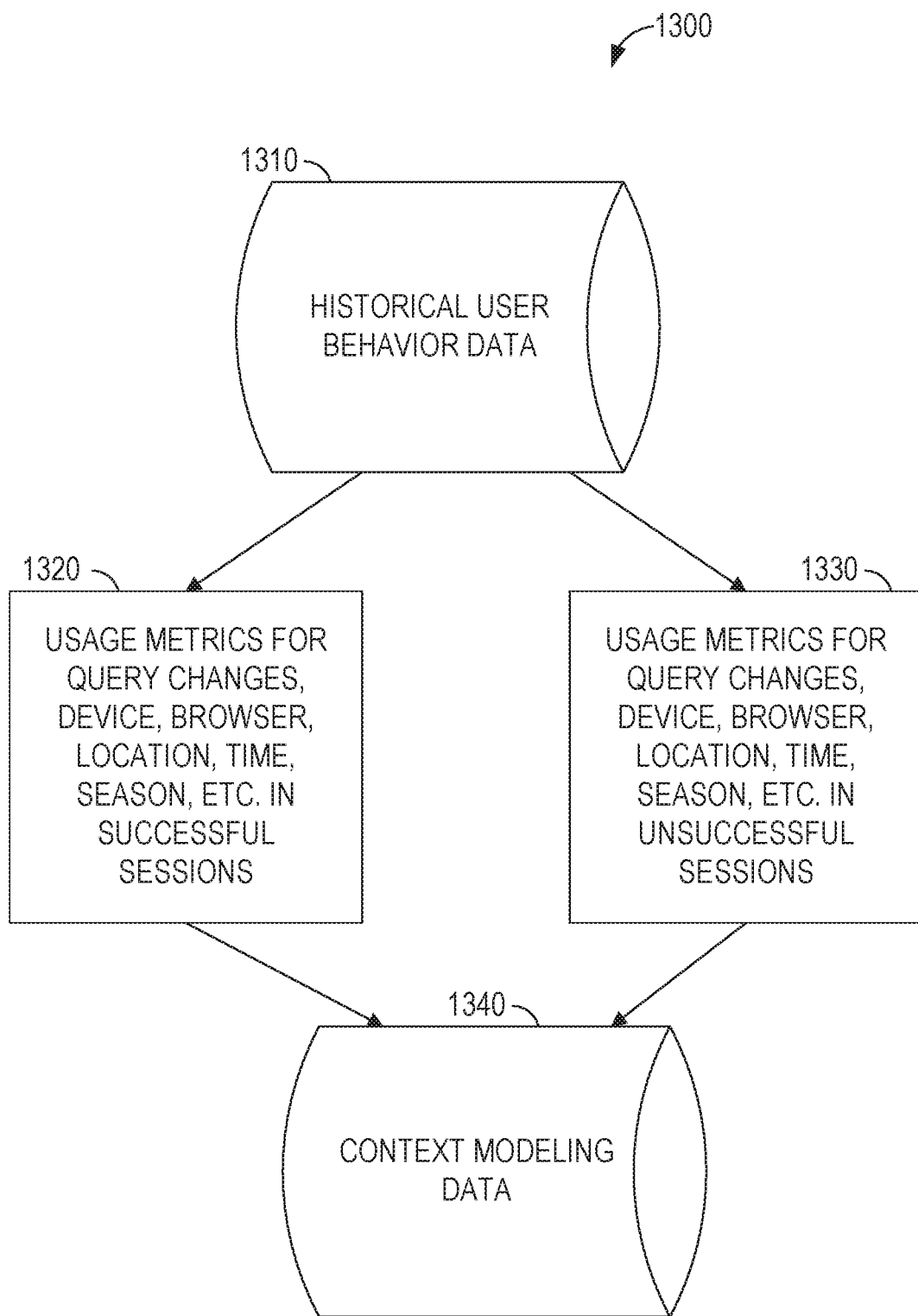
FIG. 13 is a block diagram illustrating the use of context data features in performing a method of labeling a query with aspects for use in identifying missing browse nodes, according to some example embodiments.

FIG. 13 is a block diagram 1300 illustrating the use of context data features in performing a method of labeling queries with aspects, according to some example embodiments. A database 1310 stores historical user behavior data. From the historical user behavior data, usage metrics 1320 for query changes, device, browser, location, time, season, and the like in successful sessions may be extracted. Similarly, usage metrics 1330 for query changes, device, browser, location, time, season, and the like in unsuccessful sessions may be extracted. The usage metrics 1320 and 1330 may be used to model the categories, aspects, and global filters that may be desirable in future queries in similar contexts and stored in a database 1340 as context modeling data. Context modeling data include data related to the context of the query and are based on previous queries issued from the same context or similar contexts. For example, the context may include the browser from which the query was submitted, the season during which the query was generated, and so on. Based on historical context data, a search for jackets during the summer may often be followed by a related search for windbreakers, while a search for jackets during the winter may often be followed by a related search for coats. Thus, the query modeling data would suggest both coats and windbreakers as related searches, but the context modeling data would suggest an appropriate related search based on the season.

Figure 14:
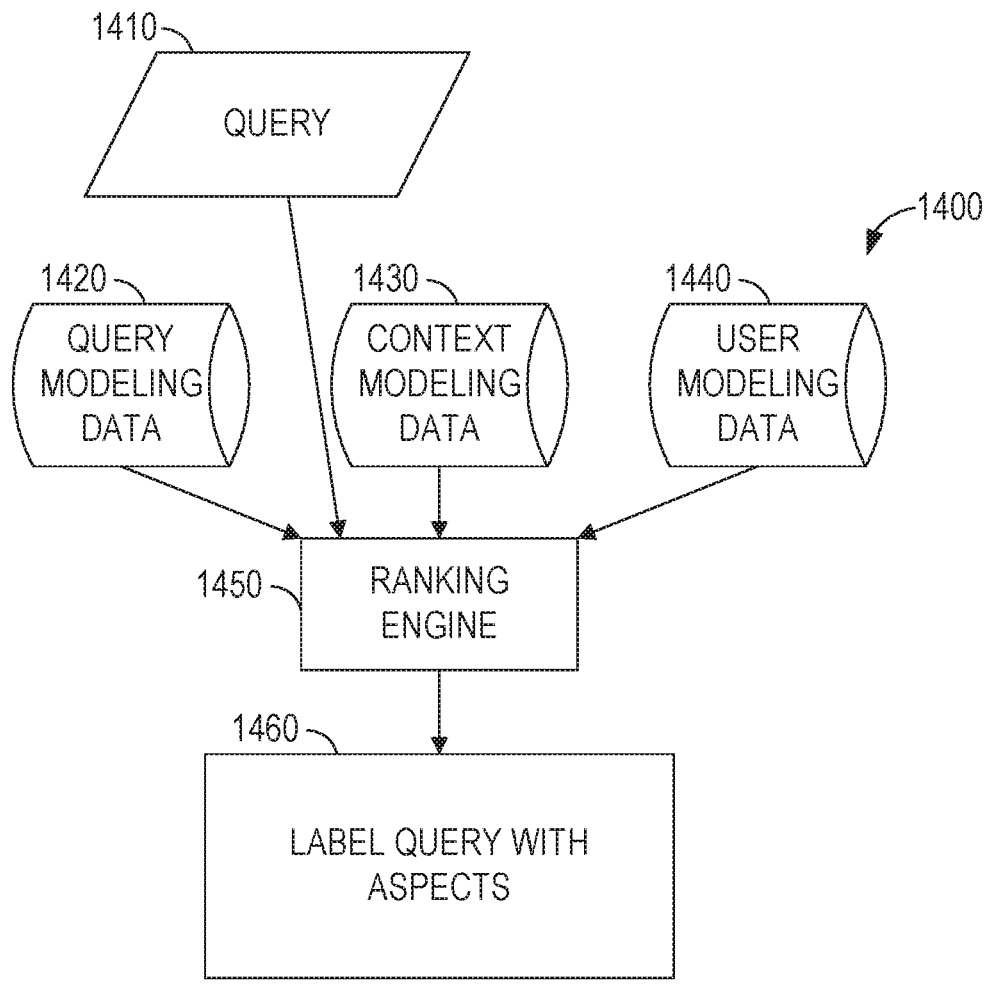
FIG. 14 is a flowchart illustrating operations of an application server in performing a method of labeling a query with aspects for use in identifying missing browse nodes, according to some example embodiments.

FIG. 14 is a block diagram 1400 illustrating factors that may be considered when labeling aspects of a query 1410, according to some example embodiments. Query modeling data 1420, context modeling data 1430, and user modeling data 1440 may be stored in separate databases, as shown, or in a combined database. The query modeling data 1420 may be derived from the historical user behavior data in the database 1110 as shown in FIG. 11. The context modeling data 1430 may be derived from the historical user behavior data in the database 1310 as shown in FIG. 13. The user modeling data 1440 may be derived from the historical user behavior data in the database 1210 as shown in FIG. 12.

Application of the context modeling data 1430 may depend on the type of device being used by the user. For example, the device may be a personal computer, a tablet, or a smart phone. The brand and version of the browser may also be reported by the user device. For example, the browser may be Internet Explorer 8 or Chrome version 32.0. Additionally or alternatively, browser information may indicate one or more features of the browser. For example, the browser may supports frames, pop-ups, or JavaScript. Furthermore, screen size or resolution may be made available to the mapping server 130. Accordingly, based on prior behavior of the current user or other users using similar devices, aspects may be labeled differently based on context. For example, a search for "glare filter" from a desktop computer may result in a different value for a size aspect than the same search being run from a smart phone.

Similarly, geolocation may provide an approximate location of the user device generated based on the IP address of the user device. For example, the user device's IP address may be known to the mapping server 130 by virtue of communication between the two machines over the Internet. The user device's IP address may be used to search a database of registered IP addresses to identify a physical address corresponding to the IP address. The physical address may be a street address, a town, a county, a state, or another political or geographic location. The session context may include session data for the communication between the mapping server 130 and the user device such as, for example, the length of time the session has existed, the number of queries run in the session, the number of results sent during the session, and so on.

In some example embodiments, only high-frequency keywords are labeled. A high-frequency keyword is a keyword that is searched for more than a minimum threshold of times in a period. For example, a high-frequency keyword may be a keyword that is searched in at least 1000 sessions per month. As another example, the threshold may be determined based on targeting a certain number of high-frequency keywords. For example, the threshold may be set so that the most-frequently searched 60,000 keywords are considered to be high-frequency keywords. The success and usage rate of each category and aspect of a keyword may be determined. The most-frequently used category and aspect may be identified and presented as a browse node. The decision to present a category or an aspect may be based on whether the success rate for the category or aspect surpasses a threshold. For example, a particular keyword may be broadly associated with many aspects, such that each aspect has a success rate of no more than 10%. A success rate of 10% may be below the threshold, and a decision not to present any aspect as a browse node may be made. For another keyword, a particular aspect may have a success rate of 40%, which may be above the threshold, and the choice may be made to present the aspect as a browse node.

The association of aspects with each keyword may be stored for later access (e.g., in a database) or generated dynamically each time a query is received. Iii embodiments in which the aspects are stored for later access in a global aspect dictionary, the associations may be periodically updated based on the additional data gathered for the query and the user in the time elapsed since the previous generation of aspect labels. For example, aspect labeling may be performed for high-frequency keywords and updated on a weekly basis.

A database storing aspect labels for search keywords may store a number of data fields for each keyword or query. For example, each of the following may be stored: the number of sessions in which the keyword or query was used ("TotalSessions"), the percentage of those sessions that resulted in a user interacting with an item ("SrpEventsRatio"), the additional number of categories used in the average successful search over the average unsuccessful search ("CategoryEventsRatio"), the average number of aspect constraints used in successful sessions ("SuccessAspectEvents"), the average number of pages of results viewed in successful sessions ("SuccessPaginationEvents"), the number of successful sessions ("SuccessSrpEvents"), the average number of global filter constraints used in successful sessions ("SuccessGlobalFilterEvents"), the percentage of sessions using a global filter that resulted in a user interacting with an item ("GlobalFilterEventsRatio"), the additional number of pages viewed in the average successful search over the average unsuccessful search ("PaginationEventsRatio"), the average number of category constraints used in successful sessions ("SuccessCategoryEvents"), and the additional number of aspects used in the average successful search over the average unsuccessful search ("AspectEventsRatio").

One or more of the following may be stored for a recommended aspect type: the total number of uses of the query ("total_imp"), the percentage of the time the use of the aspect type resulted in a success ("n_ctr"), the name of the aspect type ("aspectName"), the number of buy-it-now events associated with the aspect type ("n_bin"), the percentage of the time the aspect type was used ("n_imp_per"), the number of times the aspect type was used ("n_imp"), and the number of successes generated using this aspect type ("n_clicks").

Each of the following may be stored for a recommended aspect value: the total number of uses of the query ("total_imp"), the value of the aspect ("value"), the number of uses of the aspect ("v_imp"), the number of successes with the aspect ("v_clicks"), the number of buy-it-now events resulting from the aspect ("v_bin"), and a URL of an image representing the aspect ("url").

The decision about which aspects to label a query with may be based on thresholds corresponding to any of these values or combination(s) thereof. Some example thresholds include: CategoryEventsRatio>=0, AspectEventsRatio>=0, SuccessCategoryEvents>=0, SuccessAspectEvents>=0, n_jmp_per>=50%, and n_jmp_per>=0%.

The query 1410, query modeling data 1420, context modeling data 1430, and user modeling data 1440 may be used as inputs to a ranking engine 1450 that determines which aspects to label a query with. For example, when aspects generated using a majority of the separate modeling data agree, those aspects may be used to label the query. As another example, aspects provided by all three data analyses may be used unless they conflict, in which case a priority order is applied. For example, if the query modeling data 1420 suggests that the aspect of "color=black" is recommended for a search for "Nikon camera" and the context modeling data 1430 suggests that the aspect of "color=silver" is recommended for a search for "Nikon camera," one aspect may be used and the other ignored based on a predetermined prioritization of the data sources.

The output of the ranking engine 1450 is used to label the query 1410 with aspects, in operation 1460. The labeled query may be used to provide search results to a user or stored in a dictionary for later use by the mapping server 130.

Other kinds of search that use aspects may also make use of the above process. For example, web pages may have aspects of date of creation, date of last modification, size, author, and topic. Accordingly, search queries for web pages may be improved by identifying aspects of web pages viewed after prior use of the same or similar queries, storing those aspects in an aspect database, looking up the aspects when a later query is received, and limiting the result set for the later query to web pages having frequently desired aspects. Similar benefits accrue for local hard drive file searches, email archive searches, and the like.

Figure 15:
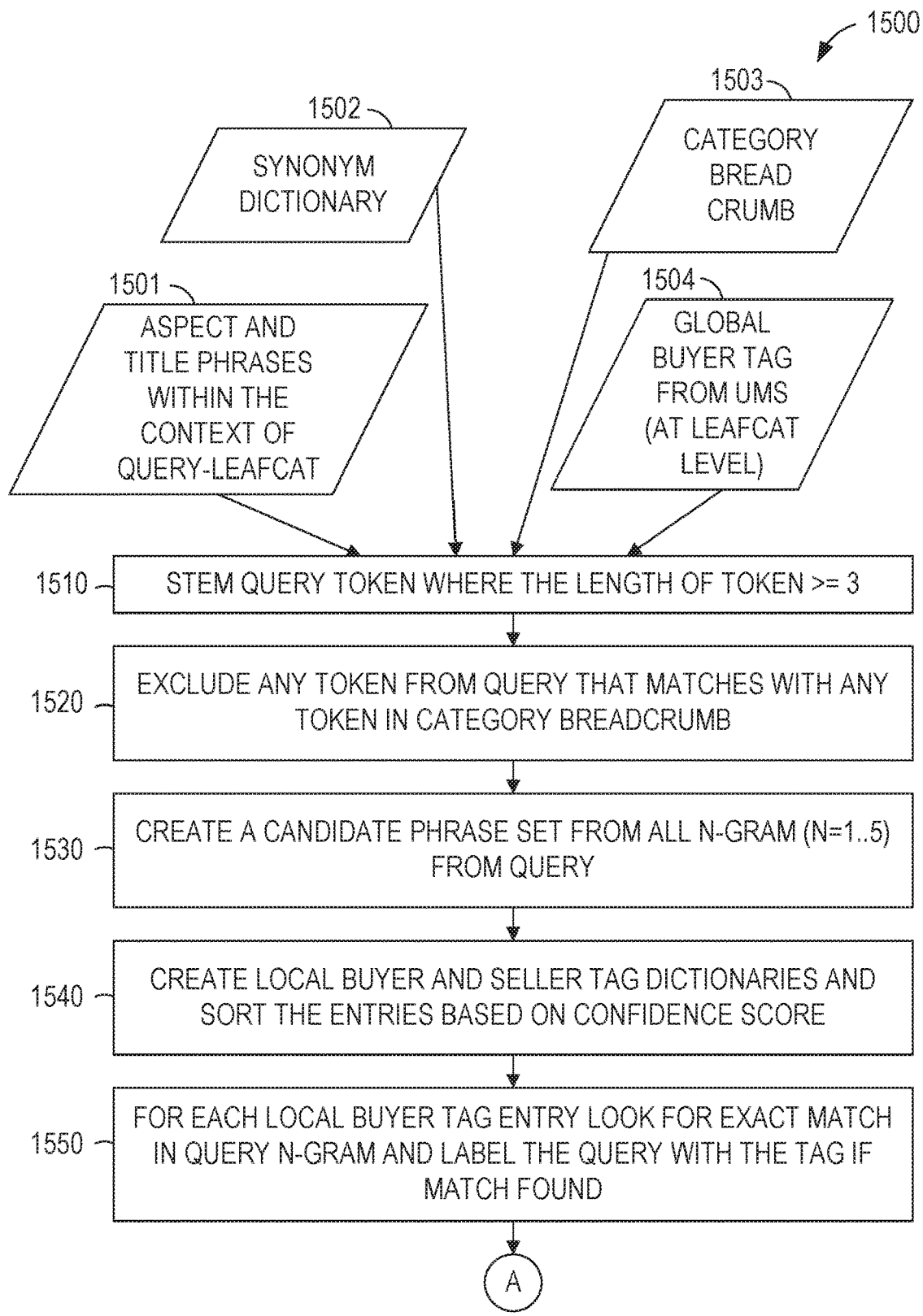
FIGS. 15-16 are a flowchart illustrating operations of an application server in performing a method of identifying missing browse nodes, according to some example embodiments.
Figure 16:
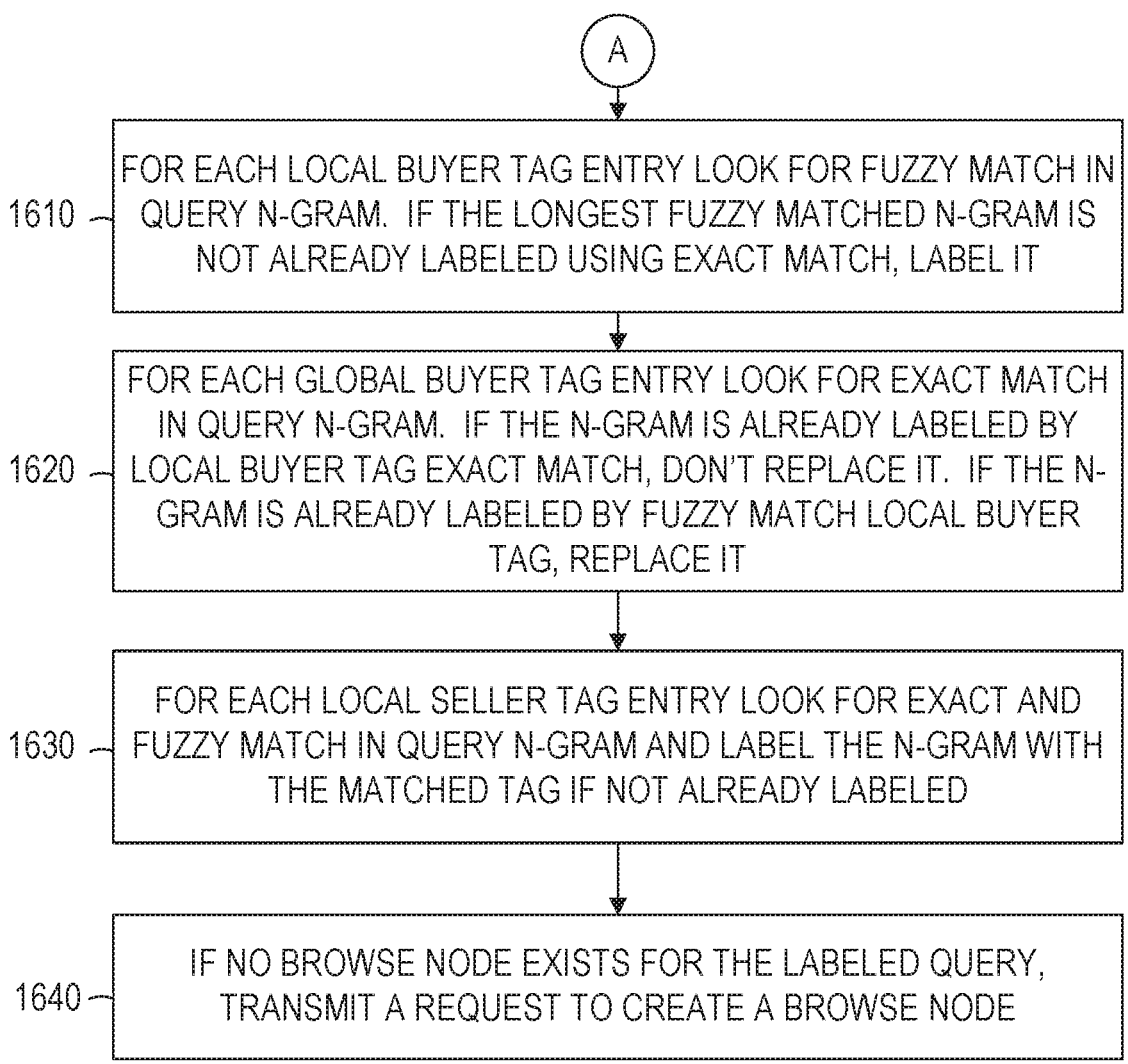

FIGS. 15-16 are a flowchart illustrating operations of a mapping server 130 in performing a method 1500 of identifying missing browse nodes, according to some example embodiments. Operations in the method 1500 may be performed by the mapping server 130, using modules described above with respect to FIG. 2.

Elements 1501-1504 are data elements used in the method 1500. Aspect and title phrases within the context of the query-leafcat (element 1501) show the frequency with which particular aspects and title phrases (i.e., n-grams appearing in titles) appear on items in individual leaf categories (i.e., a category having no sub-categories). A synonym dictionary (element 1502) allows for substitution of n-grams with their canonical forms. Example synonym matches include abbreviations (e.g., 10 meter amp=10 meter amplifier; 4wd=four wheel drive), numeric representations (e.g., thirty one=31; Samsung galaxy 2=Samsung galaxy ii), common substitutions (e.g., rotary phase converter=3 phase converter), traditional synonyms (e.g., vintage=antique; handbag=purse), space collapse (e.g., iphone 4=iphone4; Samsung galaxy 2=Samsung galaxy2), and containment match (e.g., running shoes=running/cross-training shoes; thing 1 thing 2=Dr. Seuss Thing 1 and Thing 2).

A global buyer tag, at the leaf category level, (element 1504) shows the frequency with which particular buyer tags (i.e., tags provided by buyers) appear on items in individual leaf categories. A category bread crumb (element 1503) shows the full path to the leaf category.

In operation 1510, each token in the query having at least three characters is stemmed. For example, the Porter Stemming Algorithm may be used to find the stem of each token. To illustrate, the token "happiness" may be replaced with the stem "happy," and the token "jumping" may be replaced with the stem "jump."

In operation 1520, any tokens in the query that match any token in the category breadcrumb are excluded from the query. The category breadcrumb is the complete sequence of categories and sub-categories from the root node of the category tree to the category associated with the query. For example, if the query is "nike shoes" and the category breadcrumb is "Clothing>Shoes & Apparel," the token "shoes" is excluded from the query because the token appears in the category breadcrumb.

In operation 1530, the mapping server 130 creates a candidate phrase set from all n-grams in the query in a predetermined size range (e.g., 1-5). In the example above, the only token remaining in the query is "nike," a 1-gram.

In operation 1540, local buyer and seller tag dictionaries are created and sorted based on confidence scores. For example, each buyer tag in the element 1504 for items in the leafcat of the query may be identified and sorted based on popularity. Likewise, each seller tag for items in the leafcat of the query may be identified and sorted based on popularity. Other factors may be used to determine the confidence score. For example, tags from users with higher feedback scores from other users may have higher confidence scores than tags from users with lower feedback scores.

In operation 1550, each local buyer tag in the buyer tag dictionary is checked to see if it exactly matches an n-gram in the query. If a match is found, the buyer tag is added to the query. In some example embodiments, the matching n-gram is also removed from the query.

In operation 1610, each local buyer tag in the buyer tag dictionary is checked to see if it fuzzily matches an n-gram in the query. A fuzzy match is a probabilistic match that exceeds a predetermined threshold. For example, two tokens may be found to be a fuzzy match if the number of insertions, deletions, and substitutions required to transform one to the other is below a threshold (e.g., 2). The threshold may be dependent on the length of the token (e.g., more changes may be allowed for a fuzzy match of a 10-letter word than for a 3-letter word). If a fuzzy match is found, the buyer tag is added to the query. The matching n-gram may also be removed from the query. In some example embodiments, operation 1610 is only performed if no exact match was found in operation 1550.

In operation 1620, each global seller tag in the seller tag dictionary is checked to see if it exactly matches an n-gram in the query that has not already been matched to a local tag. If a match is found, the global seller tag is added to the query. In some example embodiments, the matching n-gram is also removed from the query.

In operation 1630, each local seller tag in the seller tag dictionary is checked to see if it exactly or fuzzily matches an n-gram in the query. If a match is found, the local seller tag is added to the query. The matching n-gram may also be removed from the query.

During different exact or fuzzy matches, various confidence and support thresholds are used. The confidence of an aspect value is the probability of the value being desired when the aspect name is included in a query. Thus, the confidence may be calculated by taking the number of items clicked that have the aspect value divided by the total number of items clicked that have the aspect name. For example, if out of 142,000 searches for "belt buckle levis," 22,000 resulted in no item being clicked, 20,000 resulted in an item being clicked with no brand value, 75,000 resulted in items with "brand=Levi's" being clicked, and 25,000 resulted in items with "brand=buckle" being clicked, then the confidence that the aspect value of "Levi's" should be used for the aspect name of "brand" is 75%. The support value for the aspect name is the probability that an item having the aspect name is viewed given that any item is viewed. Thus, the support may be calculated by taking the total number of clicks on items having the aspect name and dividing by the total number of clicks. Continuing with the above example, the support for the aspect name of "brand" is 83.33%.

In operation 1640, the evaluation module 220 of the mapping server 130 determines if a browse node exists for the labeled query. For example, the mapping server 130 may request a browse node for the labeled query from the e-commerce server 120 or 140 and receive an error message or null value in response, indicating that no browse node exists. If no browse node exists, the mapping server 130 transmits a request to the e-commerce server 120 or 140 to create the browse node.

According to various example embodiments, one or more of the methodologies described herein may facilitate identifying missing browse nodes. Hence, one or more of the methodologies described herein may facilitate retrieval and presentation of results of interest to a user without requiring the user to explicitly craft a series of queries. Likewise, one or more of the methodologies described herein may facilitate improved search engine ranking of the site providing the missing browse nodes.

When these effects are considered in aggregate, one or more of the methodologies described herein may obviate a need for certain efforts or resources that otherwise would be involved in searching. Efforts expended by a user in identifying relevant queries may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Modules, Components and Logic

Certain embodiments are described herein as including logic or a number of components, modules, or mechanisms. Modules may constitute either software modules (e.g., code embodied on a non-transitory machine-readable medium) or hardware-implemented modules. A hardware-implemented module is tangible unit capable of performing certain operations and may be configured or arranged in a certain manner In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces APIs)).

Electronic Apparatus and System

Example embodiments may be implemented in digital electronic circuitry; in computer hardware, firmware, or software; or in combinations of them. Example embodiments may be implemented using a computer program product, e.g., a computer program tangibly embodied in an information carrier, e.g., in a machine-readable medium for execution by or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer; or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Software Architecture

Figure 17:
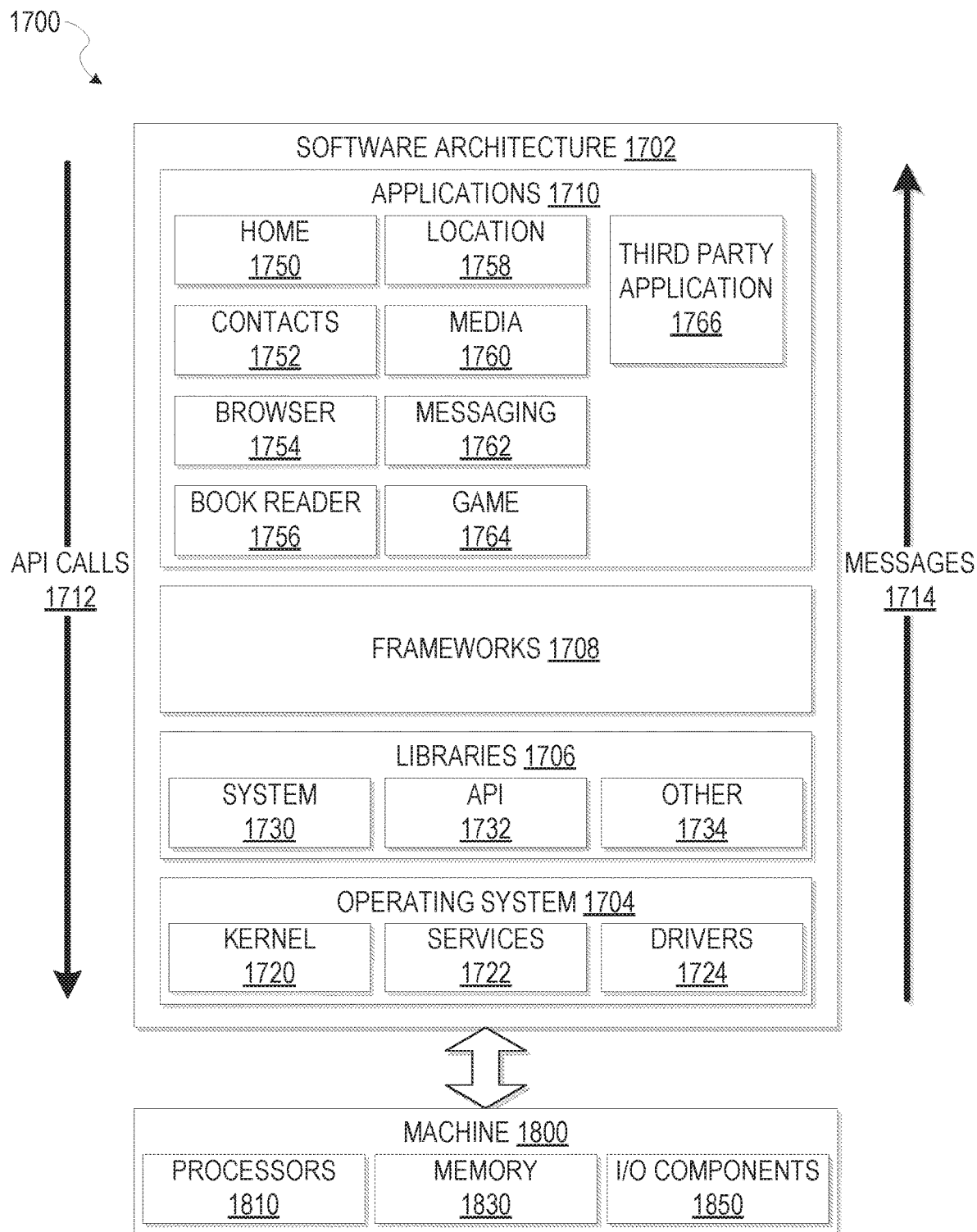
FIG. 17 is a block diagram illustrating an example of a software architecture that may be installed on a machine, according to some example embodiments.

FIG. 17 is a block diagram 1700 illustrating a software architecture 1702, which may be installed on any one or more of the devices described above. FIG. 17 is merely a non-limiting example of a software architecture, and it will be appreciated that many other architectures may be implemented to facilitate the functionality described herein. The software architecture 1702 may be implemented by hardware such as a machine 1800 of FIG. 18 that includes processors 1810, memory 1830, and I/O components 1850. In this example architecture, the software 1702 may be conceptualized as a stack of layers where each layer may provide a particular functionality. For example, the software 1702 includes layers such as an operating system 1704, libraries 1706, frameworks 1708, and applications 1710. Operationally, the applications 1710 invoke application programming interface (API) calls 1712 through the software stack and receive messages 1714 in response to the API calls 1712, according to some implementations.

In various implementations, the operating system 1704 manages hardware resources and provides common services. The operating system 1704 includes, for example, a kernel 1720, services 1722, and drivers 1724. The kernel 1720 acts as an abstraction layer between the hardware and the other software layers in some implementations. For example, the kernel 1720 provides memory management, processor management (e.g., scheduling), component management, networking, and security settings, among other functionality. The services 1722 may provide other common services for the other software layers. The drivers 1724 may be responsible for controlling or interfacing with the underlying hardware. For instance, the drivers 1724 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 1706 provide a low-level common infrastructure that may be utilized by the applications 1710. The libraries 1706 may include system libraries 1730 (e.g., C standard library) that may provide functions such as memory allocation functions, string manipulation functions, mathematic functions, and the like. In addition, the libraries 1706 may include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced. Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1706 may also include a wide variety of other libraries 1734 to provide many other APIs to the applications 1710.

The frameworks 1708 provide a high-level common infrastructure that may be utilized by the applications 1710, according to some implementations. For example, the frameworks 1708 provide various graphic user interface (GUI) functions, high-level resource management, high-level location services, and so forth. The frameworks 1708 may provide a broad spectrum of other APIs that may be utilized by the applications 1710, some of which may be specific to a particular operating system or platform.

In an example embodiment, the applications 1710 include a home application 1750, a contacts application 1752, a browser application 1754, a book reader application 1756, a location application 1758, a media application 1760, a messaging application 1762, a game application 1764, and a broad assortment of other applications such as a third-party application 1766. According to some embodiments, the applications 1710 are programs that execute functions defined in the programs. Various programming languages may be employed to create one or more of the applications 1710, structured in a variety of manners, such as object-orientated programming languages (e.g., Objective-C, Java, or C-F+) or procedural programming languages (e.g., C or assembly language). In a specific example, the third-party application 1766 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1766 may invoke the API calls 1712 provided by the mobile operating system such as the operating system 1704 to facilitate functionality described herein.

Example Machine Architecture and Machine-Readable Medium

Figure 18:
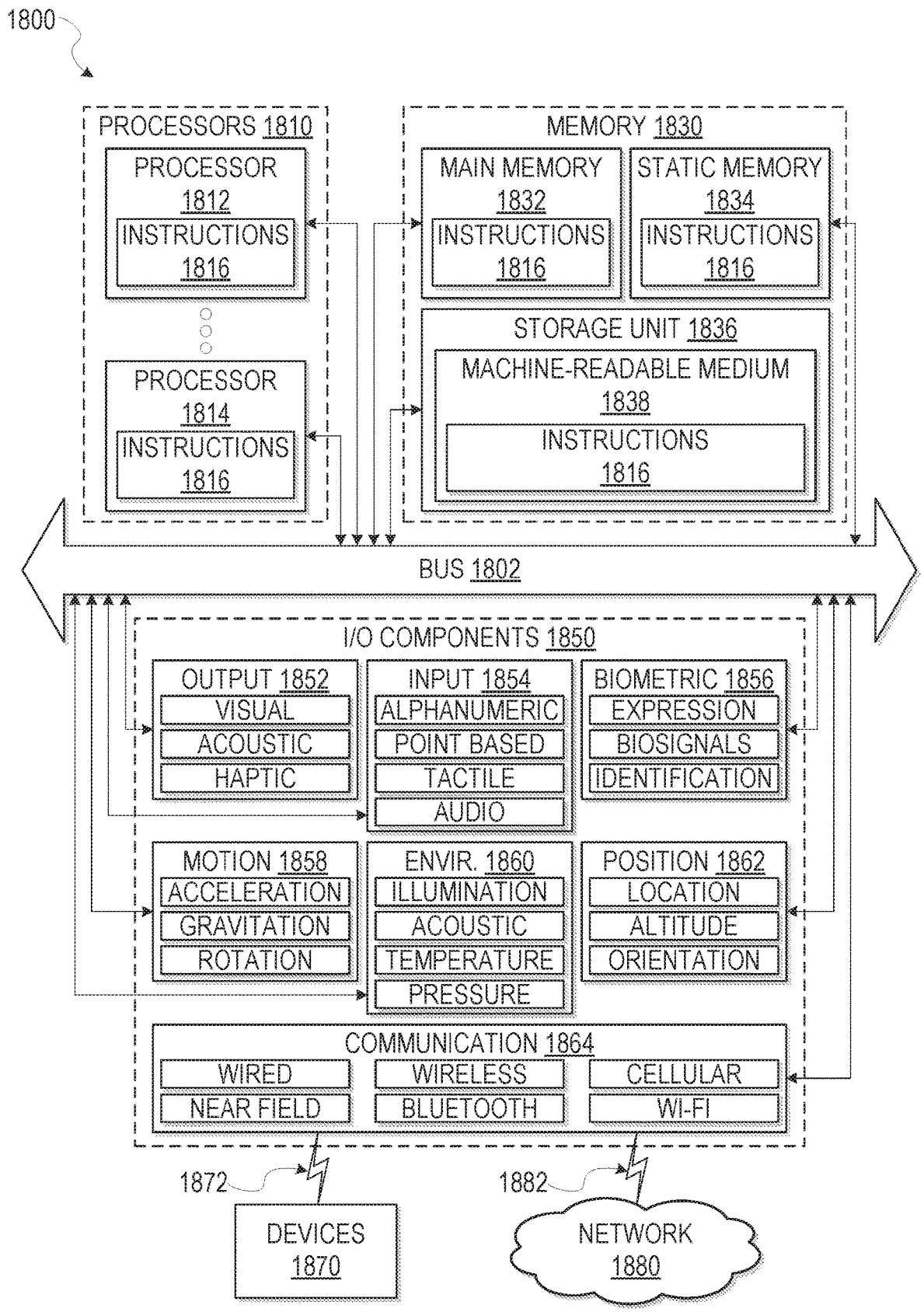
FIG. 18 is a diagrammatic representation of a machine in the form of a computer system within which a set of instructions may be executed for causing the machine to perform any one or more of the methodologies discussed herein, according to an example embodiment.

FIG. 18 is a block diagram illustrating components of a machine 1800, according to some example embodiments, able to read instructions from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein may be executed. In alternative embodiments, the machine 1800 operates as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein.

The machine 1800 may include processors 1810, memory 1830, and I/O components 1850, which may be configured to communicate with each other via a bus 1802. In an example embodiment, the processors 1810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1812 and a processor 1814 that may execute the instructions 1816. The term "processor" is intended to include multi-core processors that may comprise two or more independent processors (also referred to as "cores") that may execute instructions contemporaneously. Although FIG. 18 shows multiple processors, the machine 1800 may include a single processor with a single core, a single processor with multiple cores (e.g., a multi-core processor), multiple processors with a single core, multiple processors with multiple cores, or any combination thereof.

The memory 1830 may include a main memory 1832, a static memory 1834, and a storage unit 1836, all accessible to the processors 1810 via the bus 1802. The storage unit 1836 may include a machine-readable medium 1838 on which are stored the instructions 1816 embodying any one or more of the methodologies or functions described herein. The instructions 1816 may also reside, completely or at least partially, within the main memory 1832, within the static memory 1834, within at least one of the processors 1810 (e.g., within the processor's cache memory), or any suitable combination thereof, during execution thereof by the machine 1800. Accordingly, in various implementations, the main memory 1832, the static memory 1834, and the processors 1810 are considered machine-readable media 1838.

As used herein, the term "memory" refers to a machine-readable medium 1838 able to store data temporarily or permanently and may be taken to include, but not be limited to, random-access memory (RAM), read-only memory (ROM), buffer memory, flash memory, and cache memory. While the machine-readable medium 1838 is shown in an example embodiment to be a single medium, the term "machine-readable medium" should be taken to include a single medium or multiple media (e.g., a centralized or distributed database, or associated caches and servers) able to store the instructions 1816. The term "machine-readable medium" shall also lye taken to include any medium, or combination of multiple media, that is capable of storing instructions (e.g., instructions 1816) for execution by a machine (e.g., machine 1800), such that the instructions, when executed by one or more processors of the machine (e.g., processors 1810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1850 include a wide variety of components to receive input, provide output, produce output, transmit information, exchange information, capture measurements, and so on. In general, it will be appreciated that the I/O components 1850 may include many other components that are not shown in FIG. 18. The I/O components 1850 are grouped according to functionality merely for simplifying the following discussion and the grouping is in no way limiting. In various example embodiments, the I/O components 1850 include output components 1852 and input components 1854. The output components 1852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1850 include biometric components 1856, motion components 1858, environmental components 1860, or position components 1862, among a wide array of other components. For example, the biometric components 1856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1858 include acceleration sensor components (e.g., accelerometer), gravitation sensor components, rotation sensor components (e.g., gyroscope), and so forth. The environmental components 1860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1862 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1850 may include communication components 1864 operable to couple the machine 1800 to a network 1880 or devices 1870 via a coupling 1882 and a coupling 1872, respectively. For example, the communication components 1864 include a network interface component or another suitable device to interface with the network 1880. In further examples, the communication components 1864 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1870 may be another machine or any of a wide variety of peripheral devices (e.g., a peripheral device coupled via a USB).

Moreover, in some implementations, the communication components 1864 detect identifiers or include components operable to detect identifiers. For example, the communication components 1864 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 1864, such as location via Internet Protocol (IP) geolocation, location via Wi-Fi® signal triangulation, location via detecting an NFC beacon signal that may indicate a particular location, and so forth.

Transmission Medium

In various example embodiments; one or more portions of the network 1880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1880 or a portion of the network 1880 may include a wireless or cellular network and the coupling 1882 may be a Code Division Multiple Access (CDMA) connection, a Global System for Mobile communications (GSM) connection, or another type of cellular or wireless coupling. In this example, the coupling 1882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1816 are transmitted or received over the network 1880 using a transmission medium via a network interface device (e.g., a network interface component included in the communication components 1864) and utilizing any one of a number of well-known transfer protocols (e.g., HTTP). Similarly, in other example embodiments, the instructions 1816 are transmitted or received using a transmission medium via the coupling 1872 (e.g., a peer-to-peer coupling) to the devices 1870. The term "transmission medium" shall be taken to include any intangible medium that is capable of storing, encoding, or carrying the instructions 1816 for execution by the machine 1800, and includes digital or analog communications signals or other intangible media to facilitate communication of such software.

Furthermore, the machine-readable medium 1838 is non-transitory (in other words, not having any transitory signals) in that it does not embody a propagating signal. However, labeling the machine-readable medium 1838 as "non-transitory" should not be construed to mean that the medium is incapable of movement; the medium should be considered as being transportable from one physical location to another. Additionally, since the machine-readable medium 1838 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A computer system comprising:
   one or more processors; and
   one or more machine-readable media storing computer-useable instructions that cause the processors to:
   analyze historical user behavior data associated with a network-based system to identify a combination of a category and one or more aspects;
   determine, from a plurality of browse node pages for the network-based system, that a browse node page does not exist for the identified combination of the category and the one or more aspects, each of the plurality of browse node pages being accessible by a respective uniform resource location (URL) and providing a grouping of items in a respective category with one or more respective aspects; and
   based on the determination that the browse node page does not exist for the identified combination of the category and the one or more aspects, generate the browse node page accessible by a corresponding URL and providing items matching the identified combination of the category and the one or more aspects.

2. The computer system of claim 1, wherein the historical user behavior data comprises information regarding search queries submitted to the network-based system.

3. The computer system of claim 2, wherein the historical user behavior data is analyzed in part by combining information regarding search queries determined to be similar based on a similarity measure.

4. The computer system of claim 1, wherein the historical user behavior data comprises information regarding user interactions with search results returned in response to search queries submitted to the network-based system.

5. The computer system of claim 4, wherein the combination of the category and the one or more aspects is determined based at least in part on categories and aspects of items in the search results.

6. The computer system of claim 1, wherein the browse node page is generated in part by creating a document with a title.

7. The computer system of claim 6, wherein the document is an HTML document and the title is contained in an <h1> HTML tag.

8. A computer-implemented method comprising:
   analyzing historical user behavior data associated with a network-based system to identify a combination of a category and one or more aspects;
   determining, from a plurality of browse node pages for the network-based system, that a browse node page does not exist for the identified combination of the category and the one or more aspects, each of the plurality of browse node pages being accessible by a respective uniform resource location (URL) and providing a grouping of items in a respective category with one or more respective aspects; and
   based on the determination that the browse node page does not exist for the identified combination of the category and the one or more aspects, generating the browse node page accessible by a corresponding URL and providing items matching the identified combination of the category and the one or more aspects.

9. The computer-implemented method of claim 8, wherein the historical user behavior data comprises information regarding search queries submitted to the network-based system.

10. The computer-implemented method of claim 9, wherein analyzing the historical user behavior data comprises combining information regarding search queries determined to be similar based on a similarity measure.

11. The computer-implemented method of claim 8, wherein the historical user behavior data comprises information regarding user interactions with search results returned in response to search queries submitted to the network-based system.

12. The computer-implemented method of claim 11, wherein the combination of the category and the one or more aspects is determined based at least in part on categories and aspects of items in the search results.

13. The computer-implemented method of claim 8, wherein generating the browse node page comprises creating a document with a title.

14. The computer-implemented method of claim 13, wherein the document is an HTML document and the title is contained in an <h1> HTML tag.

15. One or more machine-readable media storing computer-useable instructions that, when used by one or more processors, cause the one or more processors to perform operations, the operations comprising:
   analyzing historical user behavior data associated with a network-based system to identify a combination of a category and one or more aspects;
   determining, from a plurality of browse node pages for the network-based system, that a browse node page does not exist for the identified combination of the category and the one or more aspects, each of the plurality of browse node pages being accessible by a respective uniform resource location (URL) and providing a grouping of items in a respective category with one or more respective aspects; and
   based on the determination that the browse node page does not exist for the identified combination of the category and the one or more aspects, generating the browse node page accessible by a corresponding URL and providing items matching the identified combination of the category and the one or more aspects.

16. The one or more machine-readable media of claim 15, wherein the historical user behavior data comprises information regarding search queries submitted to the network-based system.

17. The one or more machine-readable media of claim 15, wherein the historical user behavior data comprises information regarding user interactions with search results returned in response to search queries submitted to the network-based system.

18. The one or more machine-readable media of claim 17, wherein the combination of the category and the one or more aspects is determined based at least in part on categories and aspects of items in the search results.

19. The one or more machine-readable media of claim 15, wherein generating the browse node page comprises creating a document with a title.

20. The one or more machine-readable media of claim 19, wherein the document is an HTML document and the title is contained in an <h1> HTML tag.

* * * * *